(12) United States Patent
Bell

(10) Patent No.: US 8,877,274 B2
(45) Date of Patent: Nov. 4, 2014

(54) MODIFIED AND CONTROLLED ATMOSPHERE SYSTEM AND METHOD

(71) Applicant: Fresh Food Solutions LLC, Pacific Grove, CA (US)

(72) Inventor: Laurence Don. Bell, Pacific Grove, CA (US)

(73) Assignee: Fresh Food Solutions LLC, Pacific Grove, CA (US)

( * ) Notice: Subject to any disclaimer, the term of this patent is extended or adjusted under 35 U.S.C. 154(b) by 0 days.

(21) Appl. No.: 14/164,004

(22) Filed: Jan. 24, 2014

(65) Prior Publication Data

US 2014/0208795 A1 Jul. 31, 2014

Related U.S. Application Data

(60) Provisional application No. 61/758,376, filed on Jan. 30, 2013.

(51) Int. Cl.
*A47J 39/00* (2006.01)
*F25D 11/00* (2006.01)
*A23L 3/00* (2006.01)

(52) U.S. Cl.
CPC ............... *F25D 11/003* (2013.01); *A23L 3/001* (2013.01); *Y10S 62/923* (2013.01)
USPC ............... 426/418; 426/118; 426/419; 62/78; 62/923

(58) Field of Classification Search
USPC ......... 426/107, 118, 129, 314–316, 231, 232, 426/234, 236, 395, 410, 418–419; 429/8, 429/410, 429, 444, 515; 62/78, 125, 923, 62/450
See application file for complete search history.

(56) References Cited

U.S. PATENT DOCUMENTS 3,937,847 A * 2/1976 Elkins et al. .................. 426/231
4,513,066 A 4/1985 Simon
(Continued)

FOREIGN PATENT DOCUMENTS

DE 202006002730 U1 9/2006
DE 102008005126 B3 7/2009
(Continued)

OTHER PUBLICATIONS

"Notification of Transmittal of the International Search Report and the Writen Opinion of the International Searching Authority, or the Declaration", dated May 15, 2014, for related application PCT/US2014/013642, pp. 1-7.

*Primary Examiner* — Drew Becker
*Assistant Examiner* — Luana Z Long
(74) *Attorney, Agent, or Firm* — James F. Hann; Haynes Beffel & Wolfeld LLP

(57) ABSTRACT

The present disclosure relates to systems and methods for creating and maintaining modified and controlled atmospheres (MA/CA) in a rigid sealable container having at least one refrigeration unit with an integrated oxygen reduction structure. The refrigeration unit provides the necessary ambient atmosphere movement for the oxygen reduction structure, such as a hydrogen fuel cell. The systems and methods are useful in the, storage, transport, distribution, processing and packaging of fresh perishables with a focus on altering the natural gaseous environment around the perishables such that fresh shelf-life is extended. The systems may operate in a power generation/power production mode, such that the fuel cells maintain the MA/CA environment while providing both primary and back-up power.

25 Claims, 10 Drawing Sheets

(56) References Cited

U.S. PATENT DOCUMENTS

| | | | |
|---|---|---|---|
| 4,754,611 A * | 7/1988 | Hosaka et al. | 62/78 |
| 5,136,853 A | 8/1992 | Girardon et al. | |
| 5,163,360 A * | 11/1992 | Petz | 99/468 |
| 5,402,654 A * | 4/1995 | Rudick et al. | 62/448 |
| 5,457,963 A * | 10/1995 | Cahill-O'Brien et al. | 62/78 |
| 5,960,708 A | 10/1999 | DeTemple et al. | |
| 6,054,161 A | 4/2000 | Palmer | |
| 6,092,430 A * | 7/2000 | Liston et al. | 73/863.81 |
| 6,170,285 B1 * | 1/2001 | Huffman et al. | 62/448 |
| 6,179,986 B1 | 1/2001 | Swette et al. | |
| 6,256,905 B1 | 7/2001 | White | |
| 6,615,908 B1 * | 9/2003 | Bosher et al. | 165/48.1 |
| 6,755,041 B2 * | 6/2004 | Wessells et al. | 62/236 |
| 7,575,770 B2 | 8/2009 | Garwood | |
| 7,975,427 B2 | 7/2011 | Lagunas-Solar et al. | |
| 8,075,967 B2 | 12/2011 | Chen | |
| 8,166,872 B2 * | 5/2012 | Biotti et al. | 99/472 |
| 8,187,653 B2 | 5/2012 | Bell et al. | |
| 8,512,780 B2 | 8/2013 | Bell et al. | |
| 2003/0019231 A1 * | 1/2003 | Wessells et al. | 62/239 |
| 2004/0031705 A1 | 2/2004 | DeTemple et al. | |
| 2005/0208188 A1 | 9/2005 | Garwood | |
| 2006/0147588 A1 | 7/2006 | Garwood | |
| 2006/0228449 A1 | 10/2006 | Tewari | |
| 2007/0065546 A1 | 3/2007 | Jorgensen et al. | |
| 2007/0202368 A1 * | 8/2007 | Kim et al. | 429/20 |
| 2008/0003334 A1 * | 1/2008 | Bell et al. | 426/236 |
| 2008/0159910 A1 | 7/2008 | Dick et al. | |
| 2008/0202774 A1 | 8/2008 | Kotliar | |
| 2008/0292759 A1 | 11/2008 | Palmer | |
| 2009/0104317 A1 | 4/2009 | Clarke | |
| 2011/0151070 A1 * | 6/2011 | Bell | 426/118 |
| 2012/0122002 A1 | 5/2012 | Kamat et al. | |
| 2014/0065274 A1 | 3/2014 | Bell | |

FOREIGN PATENT DOCUMENTS

| | | |
|---|---|---|
| JP | S5545386 A | 3/1980 |
| JP | H09-201182 A | 8/1997 |
| KR | 20020056177 A | 7/2002 |
| KR | 100805234 B1 | 2/2008 |
| RU | 2005343 C1 | 1/1994 |
| SU | 604954 A1 | 4/1978 |
| WO | 2011053676 A2 | 5/2011 |

* cited by examiner

MODIFIED AND CONTROLLED ATMOSPHERE SYSTEM AND METHOD

CROSS-REFERENCE TO OTHER APPLICATIONS

This application claims the benefit of U.S. provisional patent application No. 61/758,376; filed 30 Jan. 2013.

FIELD OF THE INVENTION

The invention relates to systems and methods for creating and maintaining modified and controlled atmospheres (MA/CA) in a rigid sealable container having at least one refrigeration unit with an integrated oxygen reduction means. The systems and methods are useful in the, storage, transport, distribution, processing and packaging of fresh perishables with a focus on altering the natural gaseous environment around the perishables such that their freshness is extended.

BACKGROUND OF THE INVENTION

The consumer demand for fresh food and the desire to procure it conveniently is increasing. Modified atmosphere packaging (MAP) has been used to reduce perishability during the transport, storage and shelf-life of foods by inhibition of spoilage organisms and other deteriorative processes. MAP is the replacement of the normal atmospheric environment in a food storage package with a single gas or a mixture of gases. There are economic and global waste reduction incentives to eliminate MAP/VAC and the packaging machines and massive quantities of packaging materials currently employed to extend the shelf life of fresh and fresh cooked perishables, including fresh seafood, meat, poultry, bakery goods, prepared meals and entrees and other non-respiring perishables, as well as respiring perishables.

Modified atmospheres (MA) are also employed in non-packaging environments such as refrigerated ocean containers. Some of these systems employ degrees of "intelligence" for adjusting and optimizing the modified atmosphere and are called Controlled Atmosphere (CA) systems. However, the inventor is not aware of any refrigeration-integrated CA systems for non-respiring perishables.

Respiring perishables are often stored and shipped in modified and controlled ("MA/CA") atmospheres in order to maximize shelf life and "freshness".

The environmental conditions for optimizing the shelf life of fresh respiring perishables (fruit, vegetables, flowers, plants, etc.) are very different from the conditions for extending the shelf life of fresh non-respiring fresh perishables (meat, fish, poultry, bakery goods, etc.).

Applicant is aware of no MA/CA systems for commercial and bulk shippers of fresh non-respiring perishables. Therefore, many higher value, non-respiring perishables are currently transported by expensive air fright.

A beneficial MAP environment for most retail packages need only extend freshness to the point of being opened, given that the contents are typically consumed shortly thereafter. As a result, the short shelf life available after opening perishables packaged in these conventional MAP (Modified Atmosphere Packages) is not an issue to the end user.

In contrast, the atmosphere requirements for the storage and transport of fresh perishables, that must be further distributed beyond the transport or storage leg of the supply chain, must function to provide extended shelf life of the perishable beyond removal from the MA/CA environment. To date, this capability for CA-integrated systems exists only for respiring perishables.

MAP is also employed for the transport and distribution of large portions or cuts of non-respiring perishables. For example, conventional bulk MAP/VAC (e.g. vacuum "Cryovac" packaging) has worked reasonably well for many primal and sub-primal cuts of fresh meat due to the fact that the meat is either further trimmed and freshly cut for retail and food service sale after removal from the bulk MAP/CAP/VAC environment or sold in the MAP/VAC package to the end user. In addition, there are no regulatory food safety issues with fresh (non-seafood) meat, poultry and other bulk perishables packaged, stored or transported in conventional MAP/VAC environments.

However, fresh seafood is inherently more perishable than many other proteins and is treated differently than other fresh proteins by U.S. food safety regulators (FDA). The FDA regulates the allowable safe times and temperatures that fresh seafood packaged, transported or stored in low-oxygen, MA/CA environments must comply with. The FDA also regulates fresh seafood imported into the U.S. in low-oxygen environments under Import Alert 16-125 (http://www.accessdata.fda.gov/cms_ia/importalert_28.html). These regulations require accurate temperature records and verification of temperature compliance at all times in the supply chain where a low-oxygen environment is employed. Many countries do not regulate the technology as applied to fresh seafood, however; those skilled in the unique art of fresh seafood safety in low-oxygen environments would agree that the U.S. FDA requirements for fresh seafood in low-oxygen environments should be observed regardless of the absence of market regulations (outside the U.S.).

Recently a new MAP/CAP packaging technology was introduced as described in U.S. Pat. No. 8,187,653. A system is disclosed for reducing oxygen in MAP/CAP flexible packaging ("totes") using hydrogen fuel cells. However, U.S. Pat. No. 8,187,653 specifically excludes applications in rigid, refrigerated containers, does not have a refrigeration unit incorporated into the MA/CA container, no automatic, anomaly-mitigating capabilities and no capability of dual use, clean-tech power generation. Also, this technology requires assembling 18 one ton MAP/CAP packages in a specially equipped and staffed cold storage facility. These 18 packages must then be loaded into a refrigerated container for transport. On arrival, unloaded packages that are not opened and held unopened for inventory purposes in low oxygen MA/CA are susceptible to temperature abuse since they have no internal refrigeration capability. At scale, where literally thousands of these packages may be "inventoried" in various global facilities, managing and verifying cold chain integrity is a major food safety management task. The invention herein requires none of these costly intermediate steps and once the container is opened to be unloaded, no additional MA/CA-food safety related management is required as the low oxygen environment is released with the perishables from the refrigeration system integrated MA/CA capability.

U.S. Pat. No. 6,179,986 describes electrochemical oxygen reduction means that can be operated in mechanically refrigerated containers which is not integrated into a refrigerated system. The system described in U.S. Pat. No. 6,179,986 is, to applicant's knowledge, not being used.

Virtually all fresh seafood produced outside consuming markets (which is the majority in most cases) is transported by expensive airfreight from remote production areas to fresh markets or transported frozen due to lower price points that eliminate expensive air freight as an economically viable option.

The economic and sustainability benefits available to a provider of the most cost effective solution(s) for extending the freshness of seafood are substantial. Surface transport (by refrigerated ocean containers) produces less than 1/100th the carbon footprint of airfreight. As a result, environmentally concerned seafood supply chain experts are suggesting that all fresh seafood should be frozen to allow for surface transport (replacing expensive and environmentally-more-harmful airfreight). This denies more profitable fresh seafood to global markets and requires expensive and energy intensive freezing processes.

The needs are compelling for methods and systems for the transportation and storage of non-respiring perishables (such as fresh fish) such that fresh food may be delivered to the consumer in a fresh, safe, environmentally sound and economically viable manner.

The present invention addresses these needs.

BRIEF SUMMARY OF THE INVENTION

The invention provides methods and systems for generating and maintaining a modified and controlled atmosphere (MA/CA) environment in a mechanically refrigerated system, which includes a rigid sealable container having at least one refrigeration unit, at least one sealable gas port and an oxygen reduction means.

The oxygen reduction means is integrated into or adapted to the mechanical refrigeration system such that the recirculating, gaseous forced air stream generated by operation of the refrigeration unit is integral to the operation of and efficiency of the oxygen reduction means.

In one aspect the invention finds utility in the transportation and storage of non-respiring perishables, wherein the oxygen reduction means is effective to reduce, in 72 hours or less, and maintain the oxygen level inside the rigid, refrigerated container at a level of 10000 ppm or less.

The MA/CA environment for non-respiring perishables typically has a temperature range of 26-37° F., e.g., 26-27° F., 27-30° F., 28-31° F., 29-32° F., 30-31° F., 30-32° F., 30-33° F., 31-33° F., 31-34° F., 32-35° F., 33-35° F. or 35-37° F., typically within the range of 26-32° F. and a humidity level of greater than 75%, e.g., 75%-100%, 75%-80%, 80% to 85%, 85% to 90%, 90-95%, 90%-98% or 100%.

The system is effective to maintain the MA/CA environment for at least 3 days and for up to 6 months or longer.

The invention relies on an oxygen reduction means selected from an electrochemical means, a catalytic means, a chemical or biochemical means, a mechanical means, a pressure swing, or a combination thereof.

A preferred electrochemical oxygen reduction means comprises direct or indirect hydrogen powered fuel cells, wherein each fuel cell has an anode and a cathode. When the system operates, a recirculating, forced air stream created by the refrigeration system is directed across the one or more fuel cells, which are in gaseous communication with the air (or modified environment) inside the rigid, refrigerated container.

The one or more hydrogen fuel cells may be provided in single slice or stack or combination of fuel cell architectures.

The rigid sealable container of the system may be any refrigerated system including a refrigerated shipping container, a refrigerated truck, a refrigerated rail car, a refrigerated break bulk ship hold, a refrigerated storage room, a refrigerator, and may comprise one or more MA/CA environment and systems sensing, monitoring, control, communications and MA/CA environment enhancement and control means.

The fuel cells of the MA/CA systems of the invention may optionally be configured to produce/generate power.

When the mechanically refrigerated system of the invention is in the power production mode, the system may: (a) operate in the absence of an external power source; (b) maintain operation of the refrigeration unit to provide temperature control; (c) operate the oxygen reduction means such that the specified MA/CA conditions are maintained; (d) maintain MA/CA monitoring, control and communications systems; and (e) charge one or more batteries.

Other features, aspects and advantages of the present invention can be seen on review the drawings, the detailed description, and the claims which follow.

BRIEF DESCRIPTION OF THE DRAWINGS

In FIG. 5A, the hinged attachment is not shown and the fuel cell plate and outside air plenum are shown separately. In FIG. 5B, the fuel cell plate is in the oxygen reduction position. In FIG. 5C, the fuel cell plate approaching air plenum seals.

DETAILED DESCRIPTION OF THE INVENTION

Figure 1:
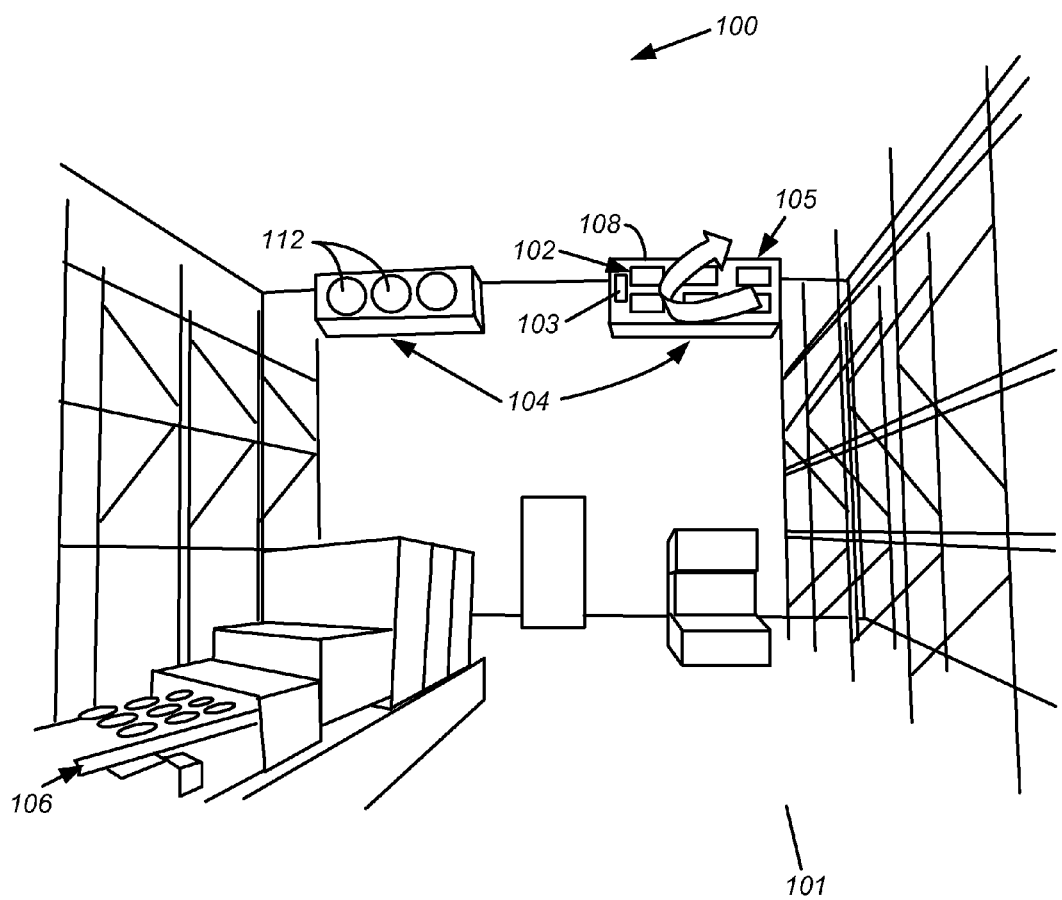
FIG. 1 depicts the inside of an exemplary refrigerated rigid sealable storage room used for CA/MA storage or processing of oxidatively-degradable material according the invention. By way of example, the figure shows two refrigeration units with a fuel cell plenum integrated into or adapted to one of the refrigeration units.

The following description will typically be with reference to specific structural embodiments and methods. It is to be understood that there is no intention to limit the invention to the specifically disclosed embodiments and methods but that the invention may be practiced using other features, elements, methods and embodiments. Preferred embodiments are described to illustrate the present invention, not to limit its scope, which is defined by the claims. Those of ordinary skill in the art will recognize a variety of equivalent variations on the description that follows. Unless otherwise stated, in this application specified relationships, such as parallel to, aligned with, or in the same plane as, mean that the specified relationships are within limitations of manufacturing processes and within manufacturing variations. When components are described as being coupled, connected, being in contact or contacting one another, they need not be physically directly touching one another unless specifically described as such. Like elements in various embodiments may be referred to with like reference numerals.

Introduction

The present invention is directed to methods and systems for generating and maintaining modified and controlled atmosphere (MA/CA) environments in mechanically refrigerated storage and transportation systems in order to enhance the shelf life of perishable goods.

Definitions

Unless defined otherwise, all technical and scientific terms used herein have the same meaning as commonly understood by one of ordinary skill in the art to which the invention pertains. Although other methods and materials similar, or equivalent, to those described herein can be used in the practice of the present invention, the preferred materials and methods are described herein.

In describing and claiming the present invention, the following terminology will be used in accordance with the definitions set out below.

As used in this specification and the appended claims, the singular forms "a," "an" and "the" include plural referents unless the context clearly dictates otherwise.

As used herein the term "mechanical refrigeration system", is used with reference to a system (container, room, etc.) that includes means for removing unwanted heat with discharge to another location. Mechanical refrigeration means include, but are not limited to fluorocarbon, ammonia, $CO_2$, cryogenic and other refrigerant/refrigeration systems.

The term, "non-respiring perishables" is used herein with reference to meat, fish, poultry, bakery, dairy and the like.

The term, "respiring perishables" is used herein with reference to fruit, vegetables, flowers, plants: whole or precut/prepared.

As used herein the term, "modified atmosphere" means an environment for food storage and transportation that has been modified from ambient conditions in terms of temperature, humidity, percentage of oxygen ($O_2$), percentage of carbon dioxide ($CO_2$), percentage of nitrogen ($N_2$) or other non-ambient atmosphere components.

As used herein the term, "controlled atmosphere" is used with reference to an environment used for transportation or storage of perishables in which said environment conditions may be continuously or intermittently regulated.

As used herein the term, "modified and controlled atmosphere (MA/CA) environment" for non-respiring perishables is used with reference to an MA/CA environment comprising an oxygen level of 10000 ppm or less and a $CO_2$ level of 25-100%.

As used herein the term, "oxygen reduction means" is used with reference to any device or material that can function to reduce oxygen levels in a high $CO_2$, refrigerated closed environment.

As used herein the term, "reducing oxygen to near zero levels" means the percentage oxygen is close to 0%, e.g., less than 0.1% (1000 ppm), less than 0.05% (500 ppm) or less than 0.01% (100 ppm).

As used herein the term, "low oxygen environment", "low $O_2$ environment", "low oxygen level", and "low $O_2$ level", with respect to an MA/CA environment for non-respiring perishables means the $O_2$ level is maintained at 10000 ppm or less, 9000 ppm or less, 8000 ppm or less, 7000 ppm or less, 6000 ppm or less, 5000 ppm or less, 4000 ppm or less, 3000 ppm or less, 2000 ppm or less, 1000 ppm or less, 500 ppm or less, or 100 ppm or less.

As used herein the term, "high carbon dioxide environment", "high $CO_2$ environment", "high carbon dioxide level", and "hi $CO_2$ level", with respect to an MA/CA environment for non-respiring perishables means the $CO_2$ level is maintained at a level from about 25% to 100%, for example, greater than 25%, greater than 30%, greater than 35%, greater than 40%, greater than 45%, greater than 50%, greater than 55%, greater than 60%, greater than 65%, greater than 70%, greater than 75%, greater than 80%, greater than 85%, greater than 90%, greater than 95%, greater than 98% or greater than 99%.

As used herein the term, "high $CO_2$ environment" with respect to an MA/CA for non-respiring perishables means the $CO_2$ level is maintained at 25%-100%.

For respiring fresh perishables, in an MA/CA environment has a $CO_2$ level maintained at less than 25%, less than 20%, less than 15%, less than 10%, less than 5%, or less than 1% $CO_2$.

As used herein the term, "continuous flushing" means adding gas (e.g., $CO_2$), with a continuous flow rate into the system at about the same rate or about 50%, about 25%, about 12.5%, or about 6.25% or about 3.12%, or about 1.56% higher than the flow rate of gas (e.g., $CO_2$), out of the system.

As used herein, a "fuel cell" consists of an anode (negative side), a cathode (positive side) and an electrolyte that allows charges to move between the two sides of the fuel cell. At the anode a catalyst oxidizes the fuel, usually hydrogen, turning the fuel into a positively charged ion and a negatively charged electron. The electrolyte is a substance specifically designed for ions to pass through it, while the electrons cannot. The free electrons travel through a wire creating an electric current. The ions travel through the electrolyte to the cathode. Upon reaching the cathode, the ions are reunited with the electrons and the two react with a third chemical, usually oxygen, to create water. Unlike batteries, fuel cells do not run down and they do not require recharging.

used herein the terms, "single slice fuel cell architecture", and "slice fuel cell architecture" are used with reference to the unstacked configuration of hydrogen fuel cells that are integrated into or adapted to the mechanical refrigeration system of the invention. An alternate configuration would be "stacked" instead of "single slice" where the several single slice fuel cells are joined together in a stacked configuration.

As used herein the term, "PEM fuel cell architecture" is used with reference to a fuel cell that comprises a proton exchange membrane ("PEM"), also known as a polymer electrolyte membrane.

Introduction

The present invention relates to, among other things, methods and systems for generating and maintaining modified and controlled atmosphere (MA/CA) environments in mechanically refrigerated systems, wherein the systems include a rigid sealable container having at least one refrigeration unit, at least one sealable gas port and an oxygen reduction means, where the oxygen reduction means is integrated into or adapted to the mechanical refrigeration system.

In a preferred embodiment, operation of the mechanical refrigeration unit generates a recirculating, forced gas stream wherein the oxygen reduction means is effective to reduce and maintain the oxygen level inside the rigid, refrigerated container at a level of 10000 ppm or less in a high $CO_2$ environment within 72 hours or less.

The MA/CA mechanically refrigerated system is useful in transporting and/or storing of oxidatively-degradable perishables, for example, perishables that are stored or transported by ocean (containers or holds), rail, over-the-road, refrigerated trucks, free standing refrigerators, cold storage enclosures and rooms, other refrigerated vessels or containers including multi compartmented refrigerated vessels, flexible refrigerated vessels and combinations and variations thereof.

The invention provides for the appropriate MA/CA environment for a given perishable that results in the ability to maintain quality and freshness over a time period of from 3 to 30 days, 10 days to 60 days, or up to 6 months or longer.

In one preferred embodiment, the oxygen reduction means is a hydrogen-powered fuel cell which provides for oxygen reduction, as well as sensing and control means necessary to maintain the MA/CA environment.

MA/CA Environments for High Value Non-Respiring Perishables

In a preferred embodiment, the invention provides mechanical refrigeration systems designed to provide optimal storage and transportation conditions for non-respiring fresh perishables, such as meat, fish, poultry, bakery, fresh-cooked entrees, meals and the like. The MA/CA mechanical refrigeration systems of the invention are effective to extend the shelf-life of such perishables.

The invention also provides mechanical refrigeration systems and methods of use to provide a preferred MA/CA environment for non-respiring fresh perishables that is ultra-low (to zero) oxygen ($O_2$) and high carbon dioxide ($CO_2$) environment.

The preferred oxygen percentage in a MA/CA environment for non-respiring fresh perishables is from about 0.01% to about 1% (about 100 to 10,000 ppm), preferably 10,000 ppm (1%) or less, 9000 ppm (0.9%) or less, 8000 ppm (0.98%) or less, 7000 ppm (0.7%) or less, 6000 ppm (0.6%) or less, 5000 ppm (0.5%) or less, 4000 ppm (0.4%) or less, 3000 ppm (0.3%) or less, 2000 ppm (0.2%) or less, 1000 ppm (0.1%) or less, 800 ppm (0.08%) or less, 600 ppm (0.06%) or less, 400 ppm (0.04%) or less, 200 ppm (0.02%) or less, or 100 ppm (0.01%) or less.

For non-respiring perishables, in a "high $CO_2$" MA/CA environment, the $CO_2$ level is maintained at greater than 25%, greater than 30%, greater than 35%, greater than 40%, greater than 45%, greater than 50%, greater than 55%, greater than 60%, greater than 65%, greater than 70%, greater than 75%, greater than 80%, greater than 85%, greater than 90%, greater than 95%.

For respiring perishables, in a MA/CA environment, the $CO_2$ level is maintained at less than 25%, less than 20%, less than 15%, less than 10%, less than 5%, or less than 1% $CO_2$.

A preferred MA/CA environment for storage and transportation of perishables may or may not include high or elevated carbon dioxide ($CO_2$), and typically contains mixtures of nitrogen ($N_2$), oxygen ($O_2$) and $CO_2$. For example, the MA/CA environment may contain (a) 15% $CO_2$+85% $N_2$, (b) 10% $CO_2$+90% $N_2$, (c) 12% $CO_2$+88% $N_2$, (d) 14% $CO_2$+1% $O_2$+85% $N_2$; (e) 15% $CO_2$+80% $N_2$+5% $O_2$, (f) 95% $N_2$+5% $O_2$+0% $CO_2$, or (g) 95% $CO_2$+4.8% $N_2$+0.2% $O_2$; or other combinations or permutations thereof.

The mechanically refrigerated systems of the invention are capable of maintaining a high $CO_2$ MA/CA environment with or without continuous "flushing" of $CO_2$.

The preferred temperature in a MA/CA environment for non-respiring fresh perishables is generally in a range of 26-37° F. In a preferred MA/CA environment, the temperature range is 30-32° F.

MA/CA Environments for Respiring Perishables

In another embodiment, the invention includes mechanically refrigerated systems designed to provide optimal storage and transportation conditions for respiring fresh perishables (fruit, vegetables, flowers, plants; whole or precut/prepared).

A preferred oxygen range for respiring perishables is from about 0% to about 21%, typically above 1% (10,000 ppm).

For respiring perishables, the $CO_2$ level is below 25% and may be as low as 0%.

The preferred temperature in a MA/CA environment for respiring fresh perishables is generally in a range of 32-37° F. In a preferred MA/CA environment, the temperature range is 32-34° F., however the temperature range can be much higher in the case of some respiring perishables (e.g., bananas in the 50° F. to 60° F. range).

Mechanically Refrigerated Containers/Systems

The invention provides mechanically refrigerated systems which comprise a rigid sealable container and have a modified and controlled atmosphere (MA/CA) environment.

The mechanically refrigerated systems for use in practicing the invention have at least one refrigeration unit, at least one sealable gas port and an oxygen reduction means.

Operation of the refrigeration unit results in generation of a recirculating, forced air stream. The oxygen reduction means is integrated into or adapted to the mechanical refrigeration system, such that the oxygen reduction means is located in the gaseous air stream generated by the refrigeration unit eliminating or reducing the need for additional fans or other power intensive features to generate air flow.

The oxygen reduction means is in direct communication with the refrigeration system components and the air recirculated by the refrigeration system, preferably in the highest volume and velocity locations of the forced air streams of the refrigeration unit.

The rigid sealable container of a mechanically refrigerated system of the invention has at least one sealable gas inlet port and/or at least one sealable gas outlet port.

In addition to at least one sealable inlet port and/or sealable exhaust port, the rigid sealable container of a mechanically refrigerated system of the invention has sealable doors, vents, drains and other penetrations and fittings to provide leak tightness to minimize and optimally completely eliminate leaks of atmosphere out of or into said container.

The oxygen level inside the rigid, refrigerated container is maintained at a level of 10000 ppm or less (when the product is non-respiring perishables).

Operation of the refrigeration unit results in generation of a recirculating, forced air stream generated by operation of the mechanical refrigeration unit. In one embodiment, air delivery to the inside of the container is across the front bulkhead at the floor of the container and the refrigerated air return/intake is across the top of the front bulkhead. There are other recirculated air flow configurations including the opposite air delivery and return locations.

FIG. 1 provides a depiction of an exemplary rigid sealable storage or processing room 100 with two mechanical refrigeration units 104 mounted near the ceiling at one end of the room. Refrigeration units 104 have air intakes 112, three of which are shown in this example. One of the mechanical refrigeration units 104 is shown having a fuel cell assembly 105, discussed below, covering one of the air intakes 112. Fuel cell assembly 105 includes a housing 108, defining a fuel cell plenum 128, see FIG. 1A, with air intakes 102, aligned with fuel cells 126, which cover the air intakes 112 of the mechanical refrigeration units 104 when mounted thereto. The fuel cell assembly 105 may also be mounted on the air delivery side of the refrigeration unit 104. The fuel cell assembly 105 of FIG. 1 is shown to have an optional generator 103 driven by the gaseous forced air stream generated by operation of the mechanical refrigeration units 104 that can be employed for charging CA system backup batteries (not shown).

Figure 1A:
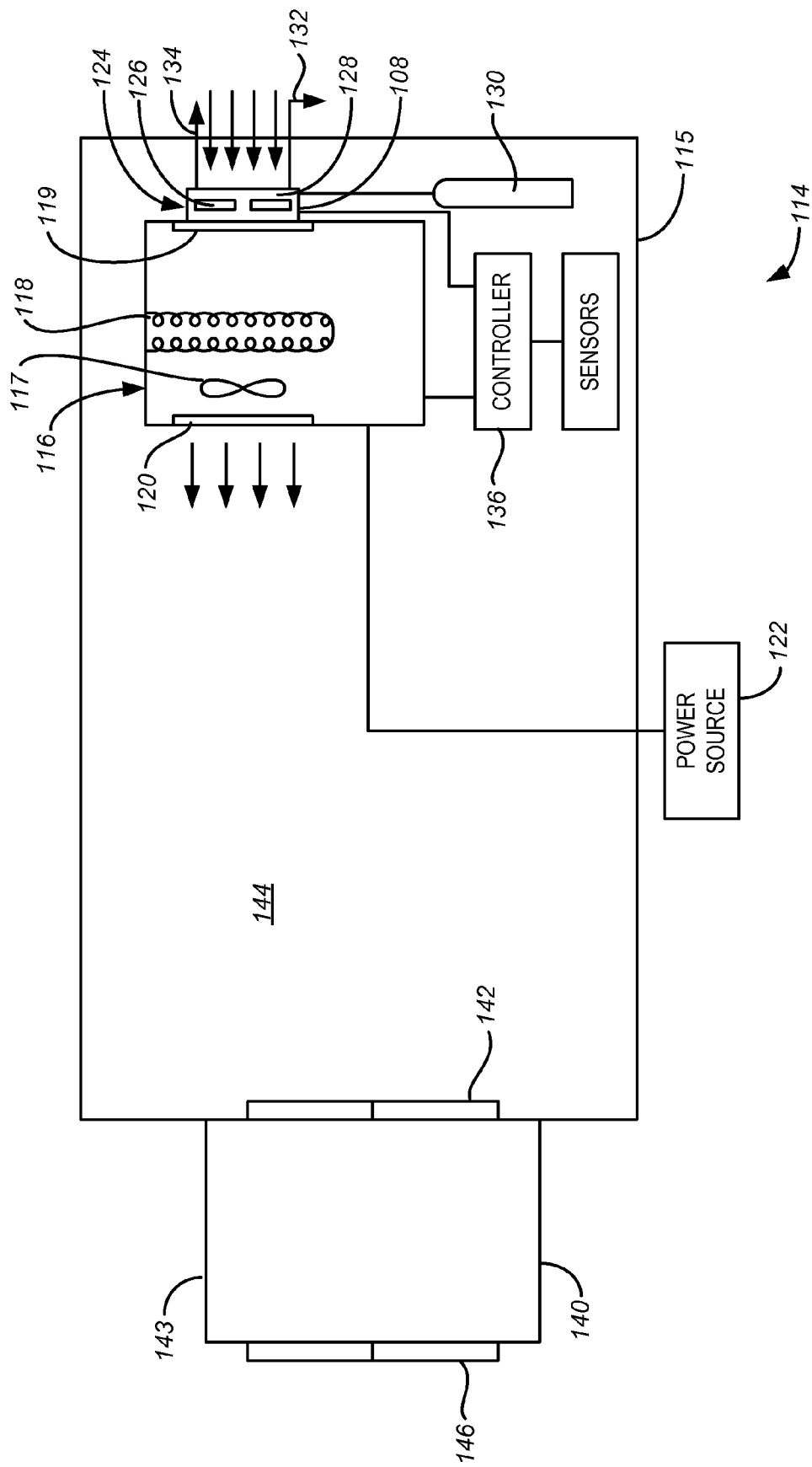
FIG. 1A is a schematic illustration illustrating a simplified overall view of a modified and controlled atmosphere (MA/CA) system within a closed environment.

FIG. 1A is a schematic illustration illustrating a simplified overall view of a modified and controlled atmosphere (MA/CA) system 114 within a closed environment 115, also sometimes called container 115, such as a room or a shipping or storage container. System 114 includes a mechanical refrigeration unit 116 of the type including a fan 117 and coils 118. Refrigeration unit 116 also includes an inlet 119, commonly considered the low-pressure side, and an outlet 120, commonly considered the high-pressure side. Refrigeration unit 116 is connected to a refrigeration unit power source 122. Refrigeration unit 116 can be generally conventional.

A fuel cell assembly 124 is, in this example, mounted to inlet 119 of refrigeration unit 116, although it could also be mounted to outlet 120. Fuel cell assembly 124 includes, in this example, six fuel cells 126 housed within the fuel cell plenum 128 defined within housing 108 of assembly 124. Fuel cells 126 are connected to a hydrogen source 130. The ambient atmosphere drawn through inlet 119 of refrigeration unit 116 passes by fuel cells 126 which combines the oxygen in the ambient atmosphere with the hydrogen from the hydrogen source 130 to create water, indicated by arrow 132, and electricity, indicated by arrow 134. Fuel cell assembly 124 is connected to a controller 136 to control the operation of the fuel cell assembly. Controller 136 may also be connected to refrigeration units 116. Various types of sensors 138, including temperature, humidity, oxygen level, carbon dioxide level, etc. may be coupled to controller 136.

In some examples a controlled atmosphere unloading lock 140, discussed in more detail below, can be used. A set of inner doors 142 connect entrance region 143 of unloading lock 140 to the interior 144 of closed environment 115 while a set of outer doors 146 provide access to entrance region 143 from the outside. In this way the controlled atmosphere within the interior 144 of closed environment 115 can be maintained while product is removed from or delivered to close container 115, preferably using mechanical conveyor systems so that personnel need not enter closed environment 115. The use of controlled atmosphere unloading lock 140 facilitates the periodic removal of perishable product. In some examples unloading lock 140 is maintained at the following conditions: a CO2 concentration of above 25%, an O2 concentration of no more than 10,000 ppm, and a temperature-controlled environment.

Figure 1B:
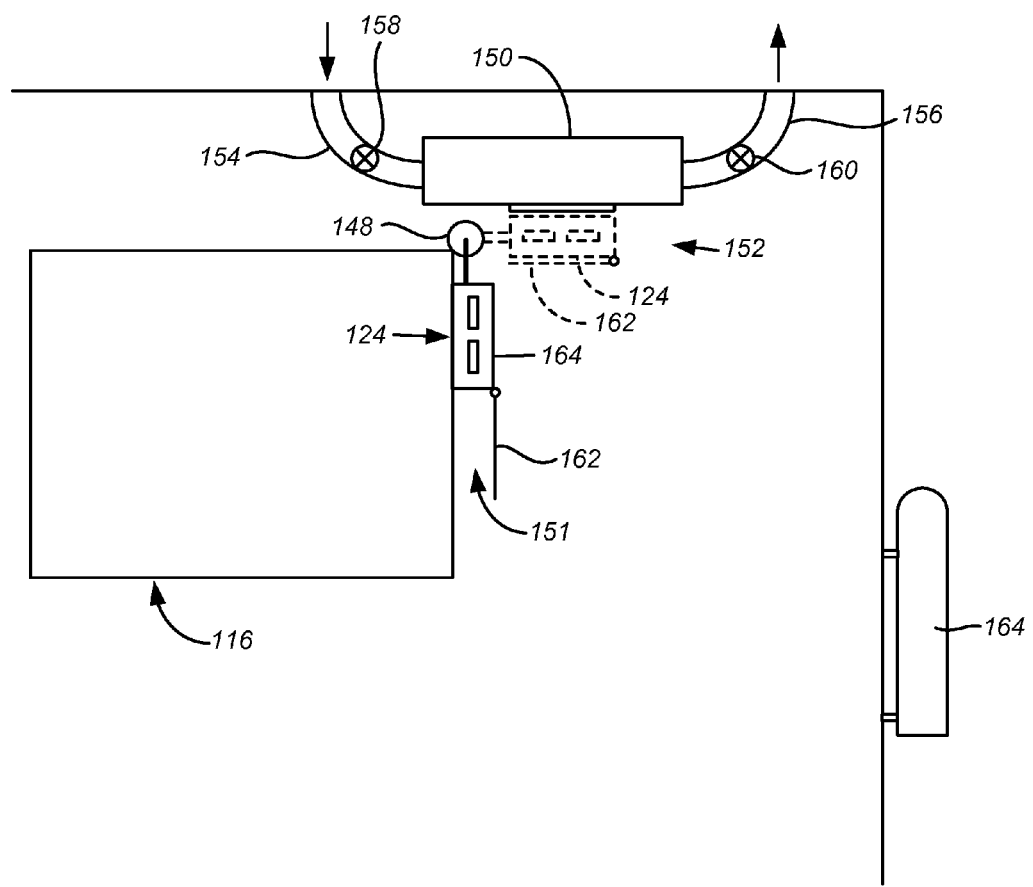
FIG. 1B shows in a simplified, schematic form a fuel cell assembly pivotally mounted to a refrigeration unit so to be movable between an oxygen reduction position and a power generating position.

In some examples, shown in a simplified, schematic form in FIG. 1B and discussed in more detail with reference to FIGS. 5A-5C, fuel cell assembly 124 can be pivotally mounted to refrigeration unit 116, such as at a pivot 148, so to be movable from an oxygen reduction position 151, shown in solid lines in FIG. 1B, and a power generating position 152, shown in dashed lines, to engage an outside air plenum 150. A movable plate 162 is moved from the solid line position of FIG. 1B part from intake surface 164 when in the oxygen reduction position 151 to the dashed line, power generating position 152 covering the intake surface. Air from outside of closed environment 115 can pass into the air plenum 150 through appropriate duct work 154, 156 and isolation valves 158, 160. Therefore, at the power producing position 152, fuel cell plenum 128 is sealed from interior 144 of closed environment 115 by plate 162. In the power producing state, fuel cell assembly 124 can be used to charge batteries or to supply all or part of the power necessary to power refrigeration unit 116, such as when there is a power outage. In addition, placing fuel cell assembly 124 in the power generation position 152 can be very useful when closed environment 115 is a refrigerated container which has been removed from the ship or motor vehicle so that power for refrigeration unit 116 is not available from the ship or motor vehicle. This would eliminate the need for mounting an auxiliary power generator onto container 115. Such auxiliary power generators are commonly used to supply power to refrigeration unit 116 after the container has been unloaded from the ship or removed from the truck or railroad car. In some examples additional hydrogen tanks 164 may be mounted onto container 115 to supplement the hydrogen contained within the hydrogen source 130.

Figure 2:
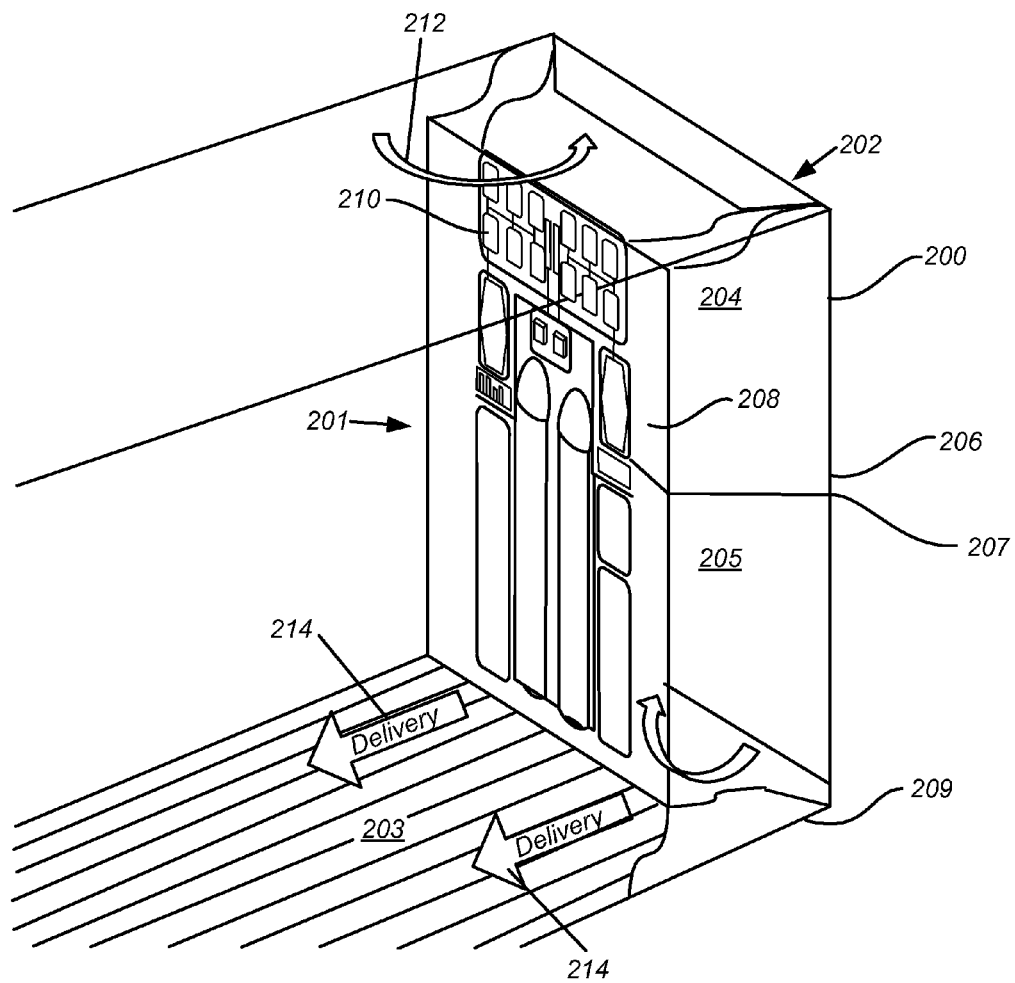
FIG. 2 is schematic depiction of an inside overview from a side angle of an exemplary refrigerated rigid sealable shipping container with compartment with doors removed wherein intake air is directed through the fuel cell plenum before entering the refrigeration unit with delivery air adjacent the container floor.

FIG. 2 is a detailed an inside view of one end of a rigid sealable container 209 of the base frame module (BFM) 201 of the claimed refrigeration system, indicating a mechanical refrigeration unit (not shown—would be in front of air intake and front bulkhead), t. The refrigeration system air intake located on the front bulkhead of the container 202, refrigeration system air delivery located at floor of front bulkhead of container 203, a low pressure (air intake) plenum 204, a high pressure (air delivery) plenum 205, the location of a gasket between the base frame module (BFM) and the front refrigeration bulkhead 206 where the container front bulkhead mates with the Base Frame Module (BFM) plenum divider 207. The FIG. also shows an exemplary hydrogen (H2) source 208 internal to the rigid sealable container 209 and an exemplary location for hydrogen fuel cells 210.

Figure 3:
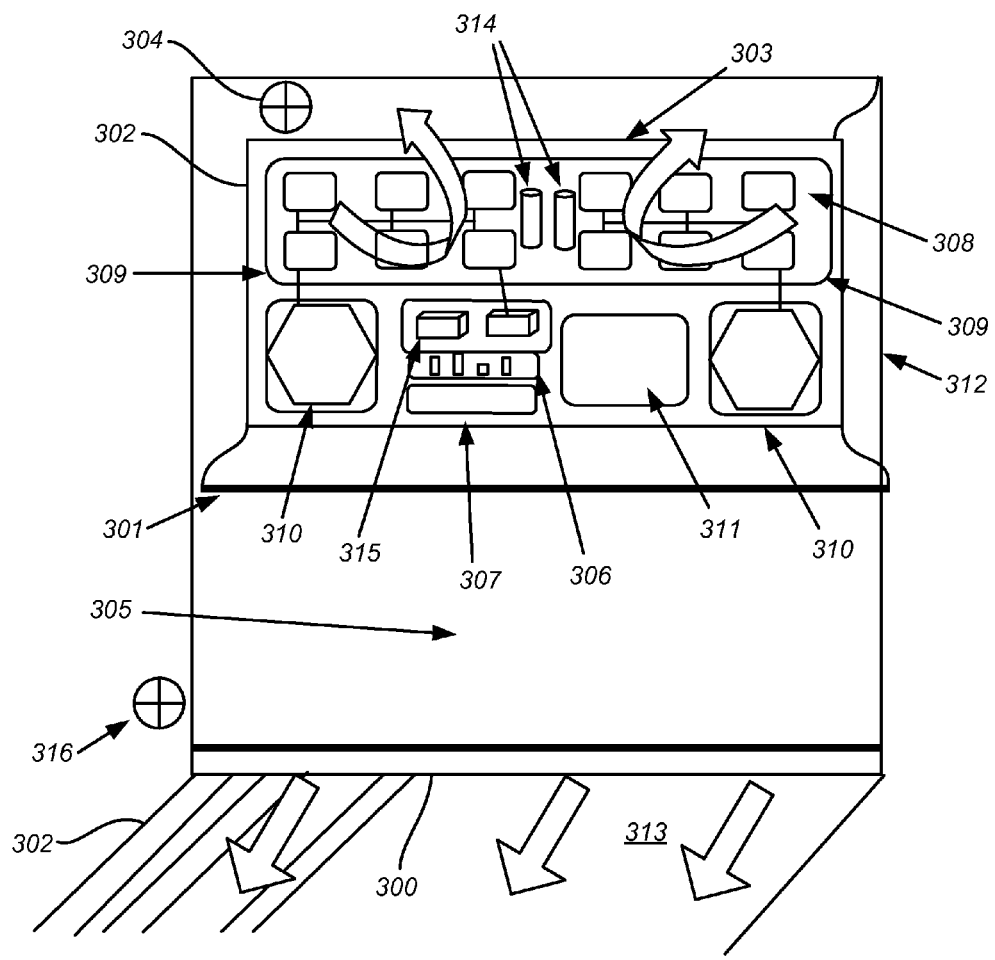
FIG. 3 is schematic depiction of an inside direct view from the front bulkhead of an exemplary refrigerated rigid sealable shipping container with compartment doors removed wherein intake air is directed through the fuel cell plenum before entering the refrigeration unit with delivery air adjacent the container floor. This embodiment would be the minimum necessary for creating and maintaining an ultra-low oxygen environment in a high CO2 pre-flushed container. Therefore, no chemical treatment modules or CO2/Volatiles scrubbers (for respiring perishables) are depicted and no on-board gasses for self-servicing or pressure control are depicted.

FIG. 3 is a full inside view of a rigid sealable container 300 at the front bulkhead 305 of an air intake (low pressure) base frame module (BFM) (with no high pressure plenum & apparatus) 301 with compartment doors removed, indicating the air flow of the mechanical refrigeration system, where refrigeration system intake air 302 is directed through a fuel cell/generator plenum with H2 module 309 before entering the refrigeration unit, a fresh air exchange valve 304, where the base frame module 301 has contact gaskets where it is mated to the container base frame module and front bulkhead 312, an H2 source 310, fuel cells 308 and a plenum with H2 manifolds 309, optional air driven generators 314 connected to optional MA/CA system batteries 315, an optional sensor module 306, an optional High Power Transmitter/Receiver (HPTR) 307 and an optional system controller 311, where delivery air 313 exits near the container floor. This embodiment (BFM, H2 supply, fuel cells and a plenum with H2 manifolds) is the minimum necessary for creating and maintaining an ultra-low oxygen environment in a high CO2 pre-flushed container that did not have said elements built into the original refrigerated system. Therefore, no chemical treatment module or CO2/Volatiles scrubbers (for respiring perishables) are depicted and no on-board gasses for self-servicing or pressure control are depicted.

Figure 4:
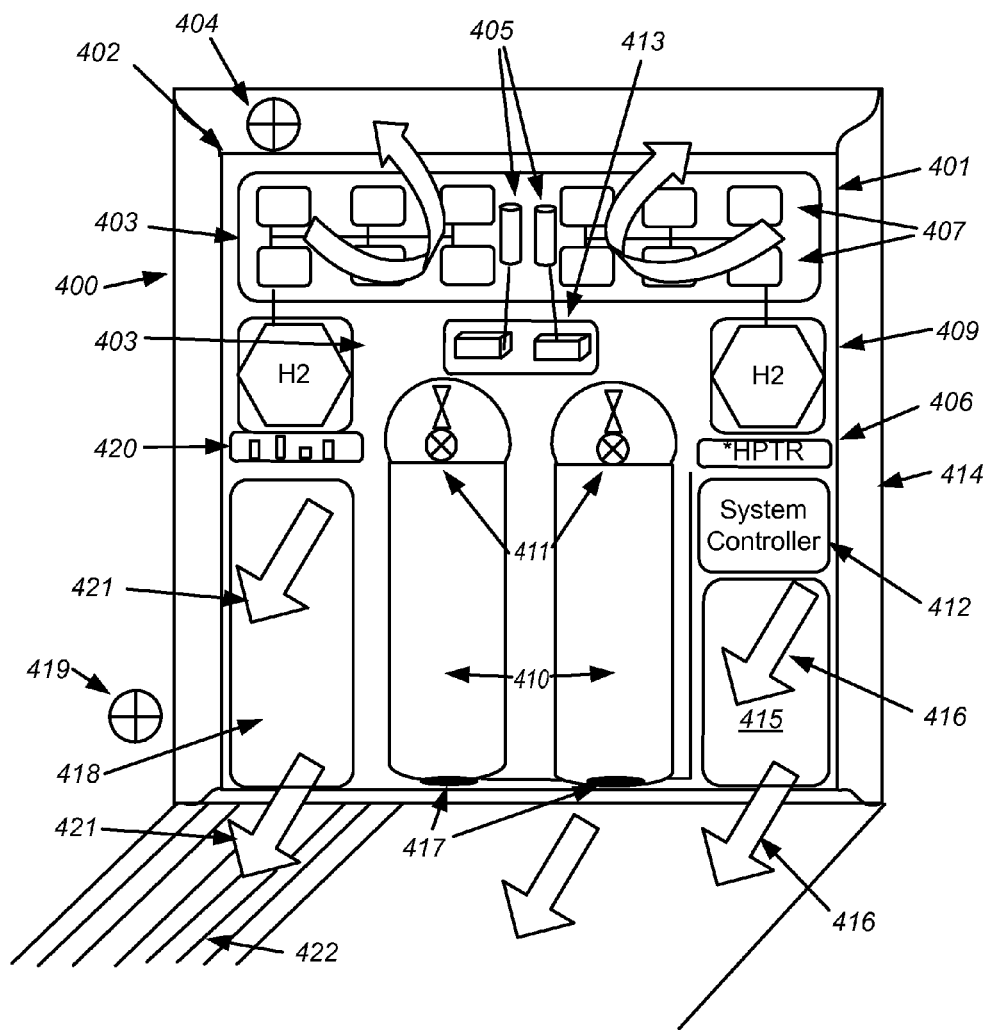
FIG. 4 is a full systems embodiment with a detailed schematic showing a full inside view of the front bulkhead of exemplary refrigerated rigid sealable shipping container with compartment doors removed wherein intake air is directed through the fuel cell plenum before entering the refrigeration unit with delivery air adjacent the container floor.

FIG. 4 is a full systems embodiment that is retrofitted to an existing refrigerated container with a more detailed full inside view of the front bulkhead of a rigid sealable container 400 indicating that intake air located on the front bulkhead of the container (behind fuel cell plate/plenum) 402 is directed through a fuel cell/generator plenum 408 before entering the refrigeration unit, adjacent a fresh air exchange valve 404, and that the base frame module 401 has contact gaskets at air intake and delivery 414. The refrigeration unit has an H2 supply 409, fuel cells 407 and a plenum with H2 manifolds 408, air driven generators connected to MA/CA system batteries 405, a sensor module 420, an HPTR 406 and a system controller 412, where delivery air exits through scrubbers 421 near the container floor 422.

The oxygen level inside the rigid, refrigerated container is maintained at a level of 10000 ppm or less (as further described below). The percentage of oxygen and other gaseous components inside the rigid sealable container of the mechanical refrigeration systems is substantially consistent through the internal MA/CA environment of the rigid, refrigerated container.

Air flow is dependent upon the refrigeration unit with the flow rate dictated by capacity/size of refrigeration unit.

The mechanically refrigerated systems of the invention provide a modified and controlled atmosphere (MA/CA) environment for periods of time greater than 3 days, and up to at least 30 days. The time period during which the MA/CA environment is maintained is at least 3 days, at least 4 days, at least 5 days, at least 6 days, at least 7 days, at least 8 days, at least 9 days, at least 10 days, at least 11 days, at least 12 days, at least 13 days, at least 14 days, at least 15 days, at least 16 days, at least 17 days, at least 18 days, at least 19 days, at least 20 days, at least 21 days, at least 22 days, at least 23 days, at least 24 days, at least 25 days, at least 26 days, at least 27 days, at least 28 days, at least 29 days, at least 30 days, at least, also not shown in FIG. 1, 45 days, at least 60 days, at least 75 days, at least 3 months, at least 4 months, at least 5 months, up to 6 months or for longer than 6 months.

The time period during which the MA/CA environment is maintained is impacted by the leak-tightness of rigid sealable container, the control features that establish and maintain the specified MA/CA environment and the amount of supplemental CO2, N2 or other gasses available for maintaining a neutral to slight positive pressure inside the container.

The leak tightness of the rigid, refrigerated room or container and the adaption or integration of the invention into the refrigerated system, combined with the ability to maintain the specified MA/CA conditions for at least 30 days provides substantial economic and food safety advantages over prior art transport and storage systems.

Oxygen Reduction Means

The invention includes the use of any device capable of reducing oxygen (O2) to near zero levels in the rigid, refrigerated room or container of a mechanically refrigeration systems.

The oxygen reduction means is effective to reduce the oxygen level inside the rigid, refrigerated container to: 10000 ppm or less, 9000 ppm or less, 8000 ppm or less, 7000 ppm or less, 6000 ppm or less, 5000 ppm or less, 4000 ppm or less, 3000 ppm or less, 2000 ppm or less, 1000 ppm or less, 500 ppm or less, or 100 ppm or less in 72 hours or less.

In a preferred embodiment, the oxygen reduction means is effective to reduce and maintain the oxygen level for at least 3 days, at least 4 days, at least 5 days, at least 6 days, at least 7 days, at least 8 days, at least 9 days, at least 10 days, at least 11 days, at least 12 days, at least 13 days, at least 14 days, at least 15 days, at least 16 days, at least 17 days, at least 18 days, at least 19 days, at least 20 days, at least 21 days, at least 22 days, at least 23 days, at least 24 days, at least 25 days, at least 26 days, at least 27 days, at least 28 days, at least 29 days, at least 30 days, at least 45 days, at least 60 days, at least 75 days, at least 3 months, at least 4 months, at least 5 months, or for at least 6 months.

The oxygen reduction means is any device that can function in a high CO2 refrigerated environment, for example, electrochemical means (e.g., fuel cells), chemical scavengers, pressure swing devices, catalysts and any other means capable of achieving oxygen levels below 1% oxygen in high CO2, refrigerated environments as quickly as possible, for example, within 72 hours or less of sealing the container.

Air flow in the mechanical refrigeration system is dependent upon the refrigeration unit, with the air flow rate dictated by capacity/size of refrigeration unit. The flow rate of the forced air stream must be sufficient for the oxygen reduction means to function as defined by reducing oxygen levels below 1000 ppm in 72 hours or less.

The oxygen reduction means may be controlled to cease operation when the oxygen level in a rigid sealable container of the invention reaches and is maintained below a predetermined level, selected from 10000 ppm or less, 9000 ppm or less, 8000 ppm or less, 7000 ppm or less, 6000 ppm or less, 5000 ppm or less, 4000 ppm or less, 3000 ppm or less, 2000 ppm or less, 1000 ppm or less, 500 ppm or less, or 100 ppm or less.

A preferred oxygen reduction means is a hydrogen powered fuel cell.

Fuel Cells

In a preferred embodiment, a mechanically refrigerated system of the invention comprises one or more fuel cells adapted to the system recirculated refrigerated air/gas stream or integrated into a refrigeration unit of the system.

In a preferred embodiment of the invention, one or more single slice hydrogen powered fuel cells are strategically distributed across the refrigerated air intake or air delivery means of the mechanical refrigeration system to optimally expose the fuel cell cathode to the highest volume and velocity recirculating atmosphere.

In another embodiment the fuel cell apparatus is designed to allow for the some or all of the cathodes to be exposed to outside air while still maintaining the desired internal modified atmosphere. This embodiment allows for power production (instead of oxygen reduction) and can be automatically controlled as necessary for both oxygen reduction and power production. It will be understood that in this embodiment, a mechanically refrigerated system of the invention can provide power production and oxygen reduction at the same time.

When the oxygen level is reduced to 10,000 ppm or less, most of the fuel cell cathodes are redirected to receive air or oxygen for power production while one or more fuel cells may remain in the oxygen reduction configuration for maintaining the oxygen level at 10,000 ppm or less (higher for respiring perishables).

The most common type of hydrogen fuel cell architecture provides a stack orientation of individual fuel cells. It is generally understood by those of skill in the art that the stack orientation of hydrogen fuel cells is a more cost effective way to generate power, than hydrogen fuel cell architecture which provides individual fuel cells in a slice orientation.

Prior art fuel cell systems for power generation in the context of refrigeration (e.g., U.S. Pat. No. 6,179,986), employs stack fuel cell architecture which does not integrate the fuel cells into the existing refrigeration system. U.S. Pat.

No. 6,179,986 therefore cannot offer the synergies of the strategically distributed, single-slice fuel cells of the present invention.

In addition, the system described in U.S. Pat. No. 6,179,986 would not be practical in the context of the transportation and storage systems described herein because U.S. Pat. No. 6,179,986 requires too much power and is extremely complex, including venting of oxygen to the exterior of the container or storage environment and complex air filtering, gas liquid separation and management of water.

The one or more hydrogen powered fuel cells for use in the present invention do not require venting of oxygen to the exterior of the container or storage environment and are easily adapted to existing refrigeration systems or new-builds with no external power or water recirculation required and with virtually no moving parts other than hydrogen and fresh air control valves.

The fuel cell is typically a single slice fuel cell, and may comprise a proton exchange membrane, also known as a polymer electrolyte membrane or "PEM". One example of a PEM is a perfluorinated ion-exchange membrane, such as a "Nafion®" DuPont™ membrane.

In a preferred embodiment of the invention, multiple single slice fuel cells are strategically distributed across refrigerated air intake or air delivery means of the mechanical refrigeration system.

In a preferred embodiment of the invention, the oxygen reduction means is one or more fuel cells comprising an anode and a cathode wherein the recirculating, forced air stream generated by operation of the refrigeration unit is directed across the fuel cell cathode such that oxygen is reacted with hydrogen ions to form water, heat and electricity inside the rigid, refrigerated container. The one or more hydrogen powered fuel cells have an anode and a cathode wherein the anode of the one or more fuel cells is in communication with a hydrogen source.

The fuel cells may be internal or external to the rigid sealable container but in gaseous communication with the container environment and refrigeration recirculated gas stream.

Other fuel cell types that can be used in practicing the invention include a SOFC (Solid Oxide Fuel Cell), a MCFC (Molten Carbonate Fuel Cell), an AFC (Alkaline Fuel Cell), or a PAFC (Phosphoric Acid Fuel Cell).

Hydrogen for use in the fuel cells of the invention may be stored in uncompressed or compressed gas or liquid form onboard the transport vehicle, for example hydrogen may be stored in gaseous form in low or high-pressure vessels or as solid state or in liquid (cryogenic) tanks.

In practicing the present invention, hydrogen may be used for both oxygen reduction and power generation. Compressed hydrogen can be safely carried and contained within or adjacent the mechanical refrigeration systems of the invention. Such safe carrying includes a means for detecting a hydrogen leak and the ability to shut the hydrogen supply off when appropriate.

The mechanical refrigeration systems of the invention further provide a means to detect a hydrogen leak (e.g., H2 contained in fireproof compartment(s) within or exterior to BFM and shutoff if leak detected) or fire (hydrogen supported or not) and extinguish it with on-board CO2 supplies or other extinguishing material controlled to maximize extinguishing efficacy in terms of where CO2 is directed in the refrigerated system.

Containers

In preferred embodiments, containers for use in practicing the invention are not flexible or a tote and are rigid sealable containers or rooms. Exemplary containers include a refrigerated shipping container, a refrigerated truck, a refrigerated rail car, a refrigerated break bulk ship hold, a refrigerated storage room, and a refrigerator.

The container is typically used to store or transport perishables by ocean (containers or holds), rail, over-the-road, refrigerated trucks, cold storage enclosures and rooms, free standing refrigerators or any other refrigerated vessel or container, including a multi-compartmented refrigerated vessel or a flexible refrigerated vessel.

The mechanical refrigeration systems of the invention are operated in compliance with international shipping regulations.

The container provides for fresh air intake and delivery through a sealable inlet port and/or a sealable exhaust port or the novel dual use fuel cell cathode fresh air plenum assembly in addition to sealable doors, vents, drains and other penetrations and fittings.

The lack of reliable leak-tightness has been cited in the past as a major obstacle to managing controlled atmosphere ("CA") environments, (e.g., ultra-low-oxygen and high CO2 atmospheres) in large, rigid, refrigerated containers. Recently refrigerated ocean container construction methods have been improved with respect to eliminating leakage. Therefore, the present invention provides containers that provide more reliable "leak tightness", which in combination with the novel features of this invention facilitate consistency of CA environments minimizing failures in environmental control and optimally mitigating temperature and oxygen control anomalies should they occur.

In preferred embodiments, shipping containers for use in practicing the present invention have essentially no oxygen permeability.

The mechanical refrigeration systems of the invention may include capabilities for detecting and verifying leak tightness before service and detecting, mitigating and communicating leakage issues in real time, during transport or storage.

Preferred embodiments include fully automated system controls for continuous self-monitoring, logging and communicating status alerts. System controls also facilitate automatic selection and delivery of proper service parameters for different perishables, "fool proof" self-diagnostics, automated initial MA servicing, continuous maintenance and analyses of critical MA/CA and refrigerated environment variables for anomaly forecasting and automated mitigation functions, including alerts and alarms optionally communicated wirelessly that collectively minimize losses due to various system malfunctions. Local or cloud-based databases retain all relevant information for data communication and mining. Such system controls may be present in the transportation or storage container, CALL or CAUL.

Controlled Atmosphere (CA) Loading Lock ("CALL") and Controlled Atmosphere

Some embodiments include novel loading, pre-conditioning and unloading/dispensing means and methods for managing periodic replenishment or removal of perishable products from primary MA/CA storage or transportation environments in order to minimize undesired changes to the primary MA/CA environment. This serves to optimize operating costs and eliminate reductions in the extended fresh shelf-life for the perishables already contained in the established MA/CA environment.

In some embodiments, the methods and systems further comprise a controlled atmosphere (CA) loading lock or "CALL" useful to precondition and transfer a perishable product from ambient air into the primary MA/CA storage or transport container/room. A CALL establishes and maintains the requisite conditions of the primary high CO2, low O2, temperature-controlled MA/CA environment as provided in the primary storage, inventory container before transferring perishables into said primary container.

Optional embodiments include means for introducing CO2, N2 and other volatiles and dispersibles into the CALL as additional or alternate preconditioning methods and processes. In preferred embodiments the transportation or storage unit also contains oxygen reduction means (preferably hydrogen fed fuel cells) along with means for introducing CO2, N2 and other volatiles and dispersibles (e.g., humidity, ozone, MCP).

In some situations, a vacuum is applied to the CALL or CAUL prior to introducing CO2 to accelerate the establishment of the high CO2, low O2 MA/CA environment in the CALL or CAUL. In other situations, an oxygen reduction means is also applied to the CALL to achieve the required high CO2, low O2 MA/CA environment.

An MA/CA inventorying capability may be present in the CALL or CAUL. The CALL or CAUL may further include sensing, control and user-interface means effective to manage and maintain the high CO2, low O2, temperature-controlled MA/CA environment.

The CALL may function to pre-condition and deoxygenate the perishable product before gaseous communication with the primary storage, or inventory MA/CA environment. These features reduce undesired degradation of the primary container MA/CA environment by air, trapped air and oxygen and air-borne environmental components when adding perishable products to MA/CA containers or rooms.

While some embodiments comprise both CALL and CAUL devices, others may contain one combination CALL/CAUL device that function appropriately for loading or unloading perishables from the primary storage or inventory container.

Figure 6:
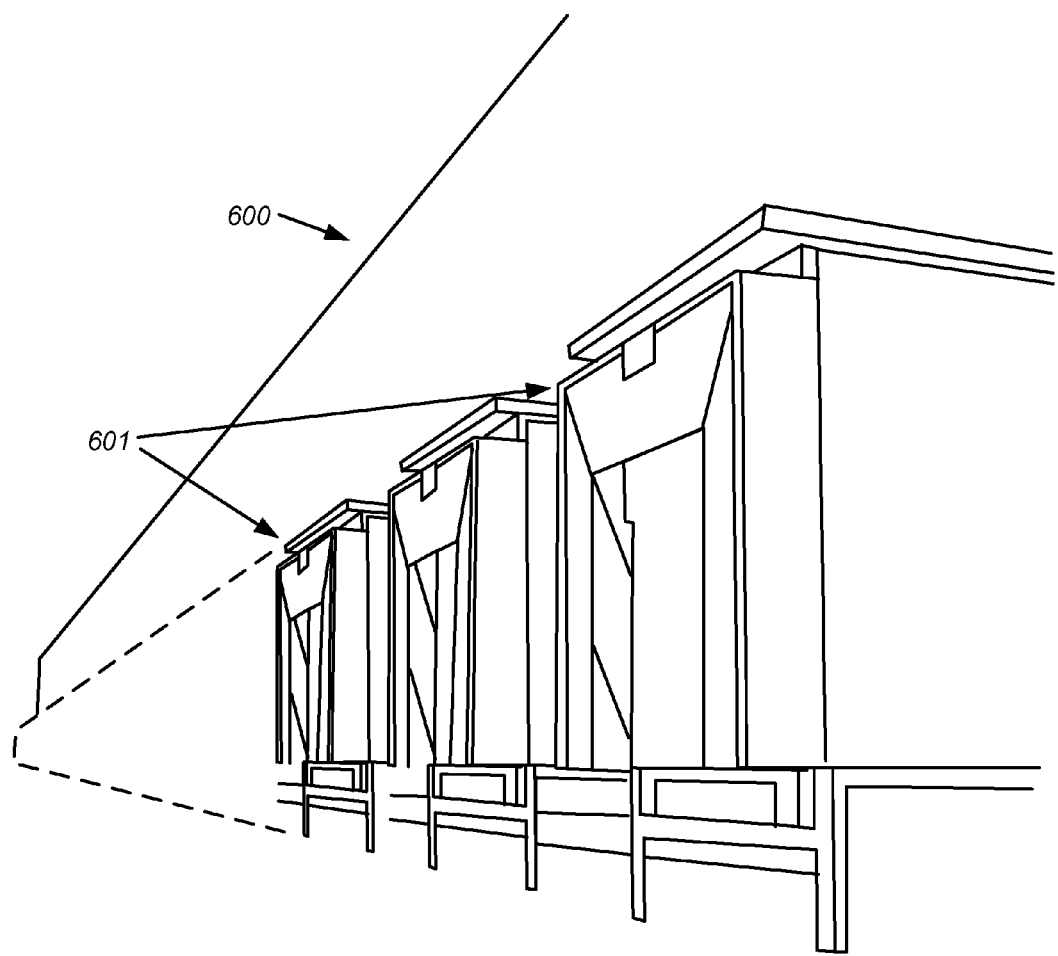
FIG. 6 is a perspective view of depicting the outside of a large MA/CA storage facility.

FIG. 6 depicts the outside of a large MA/CA storage facility which has a sealable refrigerated storage room 600 and a number of CA loading locks (CALLs) and CA unloading locks (CAULs), 601.

In some preferred embodiments, CAULs are employed to facilitate periodic removal of perishable units from a storage or inventory MA/CA environment.

The sealable CAUL may contain an automatically actuated and sealable entry door or closure between the primary storage or inventory MA/CA environment and the CAUL. This door or closure is optionally open during normal operation when non-unloading activities are not being conducted to allow the CAUL to be in constant atmosphere equilibration with the storage or inventory MA/CA environment. If the CAUL is not equilibrated with the storage or inventory MA/CA environment, the unloading door must remain sealed and the CAUL atmosphere sufficiently modified before opening the unloading door to the primary MA/CA storage or inventory MA/CA environment.

After a perishable product is transferred into the CAUL, the sealable unloading door is closed followed by opening a sealable exit/unloading/dispensing door or closure that is normally closed and sealed to exclude entry of ambient air into the CAUL and or primary MA/CA container/room.

For simply removing perishables, a CAUL need only prevent or reduce the influx of ambient air into the primary container when perishables are removed. Therefore in one embodiment the CAUL may have two sealable doors, one shared with the sealed primary chamber door and an outer door for removing the perishable from the CAUL into ambient conditions. Rapid CO2 flushing of the CAUL chamber with the outer door closed and sealed, prior to opening the primary chamber discharge door would be one preferred method for modifying the CAUL chamber atmosphere. Once the chamber air is replaced with predominantly CO2 the primary chamber door is opened, perishable conveyed into the CAUL, primary chamber door closed and sealed, outer CAUL door opened and perishable conveyed to ambient environment. In another embodiment the CALL and/or CAUL may be comprised of one revolving chamber with one sealable door that allows for loading/unloading perishables into/from the primary container by rotating to either the ambient side for loading or unloading and rotating to the primary chamber door for the perishable transfer operation.

After removal/conveyance of the perishable from the CAUL, entry and exit doors are closed to prevent entry of additional ambient air and the remaining air in the CAUL is deoxygenated by an oxygen reduction means or flushed with non-oxygen gas before reopening the entry door to the primary chamber.

The CAUL optionally includes external gas injection and flushing means. Gas flushing means may include a sealable valve(s) for flushing air out of CAUL chamber with an alternative gas or gas mixture.

A CALL or CAUL chamber may optionally be vented with air or other gas before exiting to air or another treatment chamber to dilute non-air gaseous and dispersible components. Examples of this embodiment include the use of carbon monoxide in the CA atmosphere or the need to vent CO2 or ozone from the chamber to prevent exposure of personnel.

A CALL or CAUL chamber may include a refrigeration unit, which may optionally have oxygen reduction means integrated into or adapted to the refrigeration unit as disclosed above. The CALL and CAUL may be combined for dual function.

The CALL or CAUL chamber size is dictated by the range of unit sizes to be handled by the chamber and may be as small as smallest retail packages or as large as multiple pallets or tons of products. Perishable product units can be loaded by any feasible means into a CALL or CAUL. Perishable units can range in weight from grams to tons. FIG. 6 depicts the outside of an exemplary large MA/CA storage facility with a number of CA loading locks (CALL) and CA unloading locks (CAUL).

Multiple CALL/CAUL chambers are envisioned for large production or storage facilities, e.g., those that also serve as truck unloading and loading docks.

Back-up Systems

The effectiveness of the mechanically refrigerated systems of the invention is based on the ability to maintain a modified and controlled atmosphere environment for an extended period of time.

The invention optionally provides systems and algorithms, which monitor temperature, humidity, O2, and/or CO2 in real time to execute system operating parameters and to detect undesirable trends and conditions. Should unfavorable trends or conditions be detected the system will automatically trigger corrective actions designed to prevent or minimize the loss of perishable value and to communicate such events to appropriate stakeholders. Preferred embodiments include fully automated system controls for continuous self-monitoring, logging and communicating status alerts.

In one embodiment, the rigid sealable container comprises one or more of an O2 sensing and control means, a CO2 sensing and control means, a temperature sensing and control means, and a humidity sensing, control and enhancement means.

The monitoring and communication systems of the mechanically refrigerated system also provide for maintenance of a constant positive pressure controlled by pressure sensors on-board gasses with or without inflatable/collapsible (volumetric pressure compensating) bladder In a preferred embodiment, monitoring, control and communications systems of a mechanical refrigeration system of the invention will automatically effect the release of CO2 with a concurrent increase in air or O2 under specified conditions.

A rigid sealable container of a mechanical refrigeration system of the invention may optionally include dual use fuel cell configurations that comprise top and bottom air plenums that are either sealed to prevent outside air from entering the container or conversely opened to allow outside air to either enter the container or be ported only to fuel cell cathodes.

A rigid sealable container of a mechanical refrigeration system of the invention may optionally include removable on-board gasses such as liquid or compressed CO2, N2, H2 and uncompressed H2. Uncompressed H2 is defined as <40 PSI.

The on-board gasses may be internal to the rigid sealable container or located external to the rigid sealable container with gaseous communication to internal components or the gaseous atmosphere of the rigid sealable container.

Removable or fixed wireless transmitters and receivers incorporated into various components useful to enable control and communicate with the CA/MA systems of the mechanically refrigerated systems of the invention are optionally included.

The mechanically refrigerated systems may comprise batteries (e.g., MA/CA system or refrigeration system batteries) for back-up power. Fuel cells may provide the dual function of reducing oxygen and providing power for refrigeration and/or battery charging capabilities.

Refrigeration system recirculating air driven generators effective to charge the MA/CA system back-up batteries are optionally included in the invention.

Power Generation

In one aspect, the invention provides for power generation by the fuel cells which also serve as the oxygen reduction means in a mechanically refrigerated system of the invention. When the fuel cells of the mechanically refrigerated system are in the power generation/power production mode, the fuel cells can provide power, both primary and back-up for refrigeration and the system may be used to charge one or more batteries.

The mechanically refrigerated systems of the invention may be capable of operation in a power production mode while maintaining the desired gaseous component mixture in the modified atmosphere environment of the mechanically refrigerated system, e.g., high CO2/low O2 for storage and transportation of non-respiring perishables.

Oxygen reducing fuel cells may be configured to provide power for refrigeration and additional MA/CA systems and/or battery charging capabilities potentially enabling more reliable, lower power refrigeration systems for the transport or storage of chilled perishables and without the need for expensive add-on generators during periods of unavailable line power. In traditional refrigeration systems, conventional fossil fuel burning generators ("Gen Sets") must be attached (e.g. "clip-ons") temporarily or permanently to ocean (containers or holds), rail, over-the-road, refrigerated trucks, free standing refrigerators, cold storage enclosures and rooms, other refrigerated vessels and other mobile systems to supply power during expected or unexpected primary power outages.

Therefore, this novel, dual use, fuel cell based invention offers additional economic value with regard to potentially eliminating these expensive, high carbon footprint generators.

Preferred embodiments also include refrigeration system air flow powered generators to keep MA/CA system batteries charged during low oxygen (non-power generating) conditions without the need for any hard wire connections, maintaining all control options, including mitigation and communication functions regardless of refrigeration system power status and enhancing portability and reliability of said systems.

When a mechanically refrigerated system of the invention is in a power-generating mode, the fuel cell typically comprises a switchable fuel cell cathode exposable to either the recirculating MA/CA stream inside the rigid sealable container, or to air or another oxygen source not in communication with the MA/CA atmosphere inside the rigid sealable container, maintaining desired container gaseous component mixture.

When a mechanically refrigerated system of the invention is in a power-generating mode, on-board fuels or fuel sources for supplying hydrogen necessary for electrochemical oxygen reduction means are provided including uncompressed or compressed H2 or other sources of hydrogen including methane, LNG, KOH, water or another suitable electrochemical fuel and the power to convert or generate hydrogen from the respective sources.

A fuel cell mounting plate/plenum design that can switch between recirculated oxygen reduction function to air (or oxygen) circulation across fuel cells for power production without compromising the low O2, high CO2 atmosphere, can comprise a plenum containing sealable ports for the cathode plates of single slice fuel cell(s) and a two position valve.

In one example of this embodiment, the invention provides a dual use fuel cell assembly and fresh air entry plenum assembly. As exemplified in FIGS. 3a and b, in this embodiment, fuel cells are mounted on a hinged plate with rubber/flexible seals/o-rings attached or mounted into or around the circumference of each cathode plate such that entire hinged plate (with mounted fuel cells) can be firmly mated with a corresponding air plenum plate (male cathode seal assembly to female air plenum assembly). The air plenum plate is sealed on the inside preventing air access and leakage into the air plenum until the male fuel cell cathodes are force sealed into the female air plenum. Once the cathodes are sealed into the corresponding air plenum plate, the air plenum outside-air valve is actuated to the open position allowing air to access the cathodes for power production. In this embodiment, water removal means may be necessary to maintain air access to cathode plates. In this first position, the two position valve seals off and blocks the entry of outside air or oxygen such that the plenum is in gaseous communication with the MA/CA environment with fuel cells functioning as oxygen reducing means.

The second position is actuated after the fuel cell plate has been actuated to mate up with the plenum such that the fuel cell cathodes are sealed to the air plenum such that they will only be in gaseous communication with the contents of the plenum. Upon completion of the fuel cell plate actuation and sealing steps, the plenum's two position valve is opened to the outside air or another oxygen source for power production in a manner effective to produce electrical power while maintaining desired internal container gaseous component mixture.

Figure 5A:
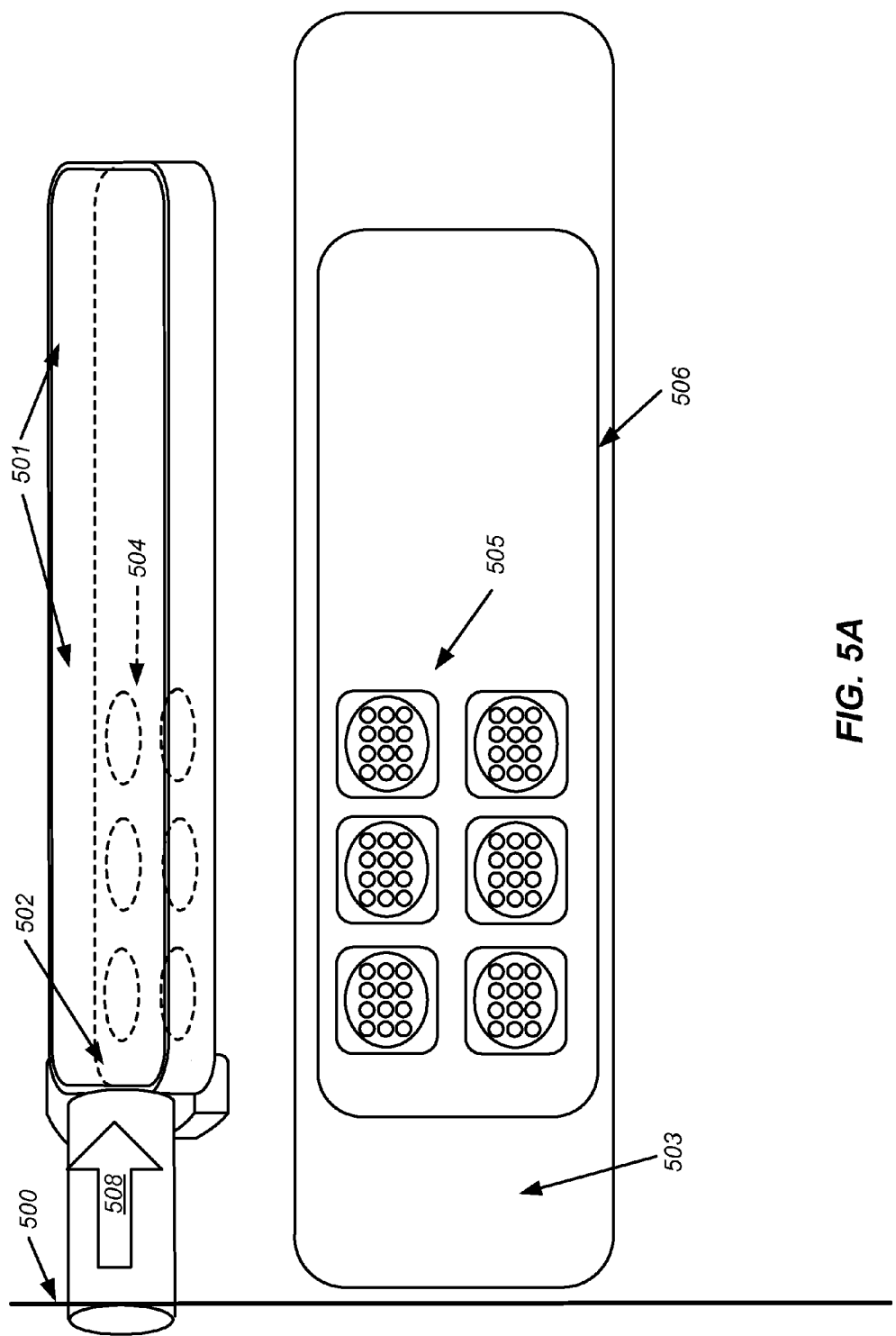
FIGS. 5A, 5B and 5C are schematic depictions of an exemplary fuel cell embodiment which comprises a dual use fuel cell assembly and fresh air entry assembly showing the front bulkhead with an air plenum fixed to the rigid sealable container.
Figure 5B:
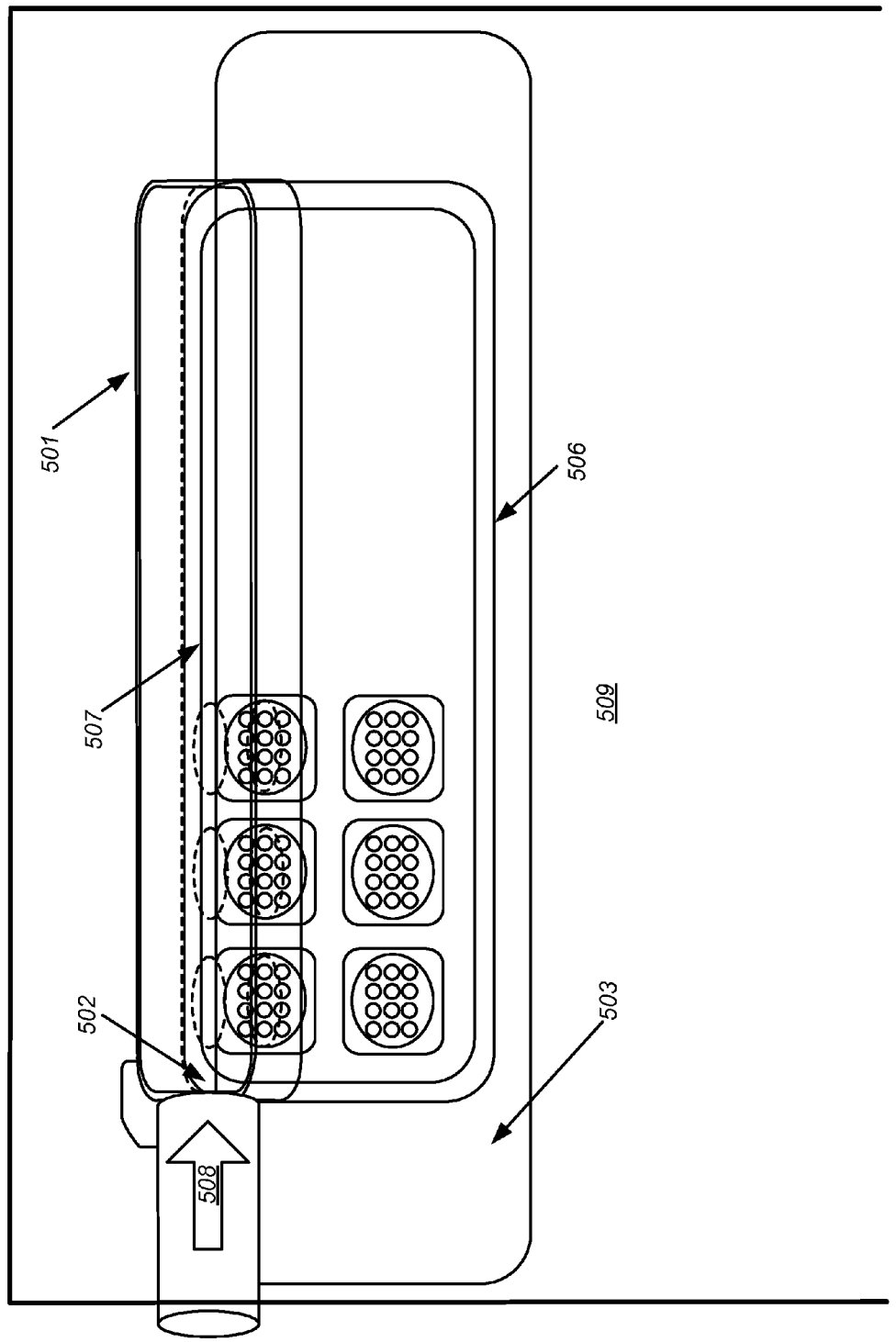
Figure 5C:
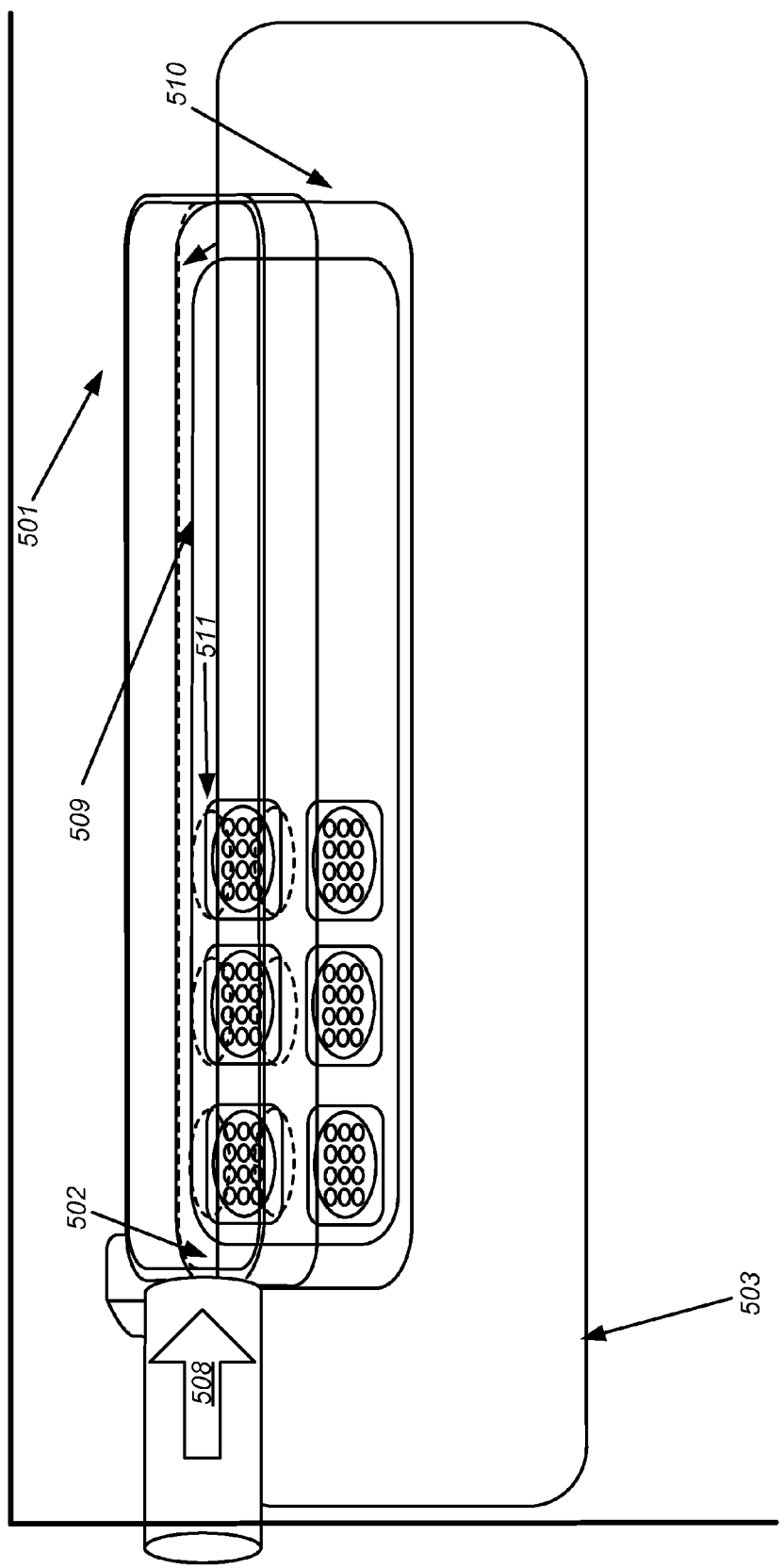

FIGS. 5A-5C show the front bulkhead 500 with an air plenum fixed to the rigid sealable container 501 having an air plenum shut off valve 502, a refrigeration air return intake screen 503 and a hinged or otherwise moveable fuel cell mounting plate 504 which seals to air plenum via cathode O-rings and a main seal 506. When the air plenum shut off valve 502 is open outside air 508 can enter the system.

In CA operations, the rigid sealable container is maintained under slight internal positive pressure at all times, to assist in maintaining a low oxygen atmosphere. A hinged plate that allows for positive pressure to enhance the mechanically actuated sealing pressure of the fuel cell plate is a desired feature. The air plenum can also serve to provide for fresh air access (fresh air entry port) in the event of a temperature or oxygen control anomaly that requires venting the low oxygen, high CO2 atmosphere. In this situation, air plenum access valve would be opened without fuel cells in position to allow air into container.

Utility

The present invention facilitates refrigeration capabilities for transportation and storage of non-respiring fresh perishables including seafood in MA/CA environments. The MA/CA systems and processes for extending the freshness of perishables described herein are substantially different in form, function and cost from prior art refrigerated containers, storage systems, MAP and CAP (distribution packaging) applications currently in use.

The invention described herein may be effective to double, triple or quadruple the fresh shelf life and time available for fresh marketing and sale of non-respiring (and respiring) perishables.

The present invention facilitates safer, manageable logistics services for fresh seafood and other fresh proteins and at significantly lower cost with less environmentally damaging packaging waste and substantially lower carbon foot prints. The invention will further provide more consistent quality after products such as fresh seafood are removed from the MA/CA environment.

EXAMPLES

The invention is further illustrated by the following examples. The examples are provided for illustrative purposes only. They are not to be construed as limiting the scope or content of the invention in any way.

Example 1

Fresh Wild Alaskan Salmon

For example, properly handled fresh wild Alaskan salmon can be inventoried fresh in cold storages or in containers equipped with the inventions herein. Market prices for fresh-wild-Alaskan Salmon are normally very profitable. The inventions herein will facilitate tripling and quadrupling fresh shelf life and the time available for fresh marketing and sale.

Example 2

Global Transport of Fresh Salmon by Lower Cost Ocean Freight

In addition, over 60% (150 million pounds in 2012) of all fresh salmon consumed in the U.S. is imported by jet aircraft at high cost and with 99% higher carbon footprint per pound compared to ocean transport. This invention will allow global transport of fresh salmon by lower cost ocean freight. Air freighted fresh salmon is also shipped in "Styrofoam" which ends up as non-biodegradable global waste and pollution. Because the invention herein is continuously refrigerated (unlike air freight) "Styrofoam" can be replaced with recyclable cardboard cartons.

Example 3

Back-up Power when Container Unloaded at Port—Improperly Handled

Refrigerated ocean containers are sometimes without power during trucking to and from ports and during loading, unloading and transloading to other ships. Because "clip-on" generators are not always available or attached to the containers, refrigeration temperatures can be compromised. The invention herein offers a built in solution to these interruptions by virtue of the dual use fuel cell option. The MA/CA system fuel cells can be configured to charge refrigeration system backup batteries that can be switched to provide backup power when regular line power is not present.

Example 4

Loss of Oxygen or Adequate Temperature Control is Sensed and Mitigated

In the event that the MA/CA system determines that temperature control is not within critical limits for FDA or oxygen control not within the limits for quality optimization, proprietary algorithms automatically adjust the environment to prevent violation of FDA requirements and/or to minimize loss of quality while also communicating said issue to stakeholders in real time.

As is apparent to one with skill in the art, various modifications and variations of the above aspects and embodiments can be made without departing from the spirit and scope of this invention. Such modifications and variations are within the scope of this invention.

What is claimed is:

1. A method for extending the storage life of non-respiring foodstuffs comprising:
    generating and maintaining a modified and controlled atmosphere (MA/CA) environment in a mechanically refrigerated system within a rigid sealable container, the mechanically refrigerated system having at least one mechanical refrigeration unit having an air inlet and an air outlet, by:
    generating a recirculating forced atmosphere stream within the rigid sealable container by operation of said mechanical refrigeration unit, the recirculating forced atmosphere stream being from the ambient atmosphere inside the rigid sealable container;
    positioning an oxygen reduction means along the recirculating forced atmosphere stream within the container interior at a chosen one of the air inlet and the air outlet to reduce the amount of oxygen within the forced atmosphere stream; and
    operating the oxygen reduction means on the recirculating forced atmosphere stream in an oxygen reduction mode to reduce the oxygen level to, and maintain the oxygen level at, 10,000 ppm or less inside the rigid sealable container.

2. The method of claim 1, further comprising operating said oxygen reduction means to reduce the oxygen level inside said rigid, refrigerated container to 1000 ppm or less.

3. The method of claim 1, further comprising operating said oxygen reduction means to reduce the oxygen level inside said rigid, refrigerated container to 1000 ppm or less in 72 hours or less.

4. The method of claim 1, wherein operating the oxygen reduction means is carried out in an MA/CA environment comprising a $CO_2$ level of 25-100%.

5. The method of claim 4, wherein said operating the oxygen reduction means is carried out in an MA/CA environment comprising a $CO_2$ level of greater than 90%.

6. The method of claim 1, wherein said oxygen reduction means is selected from the group consisting of electrochemical means, catalytic means, chemical or biochemical means, mechanical means, pressure swing, and a combination thereof.

7. The method of claim 6, wherein:
the oxygen reduction means operating step is carried out:
using one or more hydrogen powered fuel cells, each comprising an anode and a cathode; and
so that the recirculating forced atmosphere stream is directed across the one or more fuel cells where oxygen is reacted with hydrogen ions to form water, heat and electricity.

8. The method of claim 1, wherein said rigid sealable container is selected from the group consisting of, a refrigerated shipping container, a refrigerated truck, a refrigerated rail car, a refrigerated break bulk ship hold, a refrigerated storage room, and a refrigerator.

9. The method of claim 1, further comprising at least one of transportation and storage of non-respiring perishables in the rigid sealable container of said mechanically refrigerated system.

10. The method of claim 1, wherein the system further comprises a controlled atmosphere unloading lock (CAUL) to facilitate periodic removal of perishable product, wherein the CAUL can maintain the following conditions: a $CO_2$ concentration of above 25%, an $O_2$ concentration of no more than 10,000 ppm, and a temperature-controlled environment.

11. A method for generating and maintaining a modified and controlled atmosphere (MA/CA) environment in a mechanically refrigerated system, comprising:
providing a rigid sealable container having at least one refrigeration unit;
integrating or adapting an oxygen reduction means into the mechanically refrigerated system, said oxygen reduction means selected from the group consisting of electrochemical means, catalytic means, chemical or biochemical means, mechanical means, pressure swing, and a combination thereof;
generating a recirculating forced atmosphere stream from the ambient atmosphere inside the rigid, refrigerated container by operation of said mechanical refrigeration unit, the recirculating forced atmosphere stream passing through the mechanical refrigeration unit; and
operating the oxygen reduction means in an oxygen reduction mode using the recirculating forced atmosphere stream to reduce the oxygen level to, and maintain the oxygen level at, 10,000 ppm or less inside the rigid, refrigerated container in 72 hours or less;
the integrating or adapting said oxygen reduction means step being carried out using one or more hydrogen powered fuel cells, each comprising an anode and a cathode, so that the recirculating forced atmosphere stream is directed across the one or more hydrogen powered fuel cells where oxygen is reacted with hydrogen ions to form water, heat and electricity; and
selectively exposing the one or more hydrogen powered fuel cells to either the recirculating, forced atmosphere stream when in the oxygen reduction mode, or to air or another oxygen source from other than the atmosphere inside said rigid sealable container in a power generating mode.

12. The method of claim 9, wherein when said mechanically refrigerated system is in the power generating mode, the system is effective to accomplish one or more the following:
charge one or more batteries;
maintain operation of the refrigeration unit to provide temperature control; and maintain operation of the oxygen reduction means to maintain the specified oxygen level.

13. A modified and controlled atmosphere (MA/CA) system for use with non-respiring foodstuffs, comprising;
a rigid sealable container defining a container interior capable of containing a supply of non-respiring foodstuffs within the container interior;
a mechanical refrigeration unit having an air inlet and an air outlet, capable of generating a recirculating forced atmosphere stream from the container interior, through the mechanical refrigeration unit, and back into the container interior said rigid sealable container and said mechanical refrigeration unit constituting a refrigeration assembly;
an oxygen reduction means, positioned along the forced atmosphere stream within the container interior, for reducing the amount of oxygen within the forced atmosphere stream; the oxygen reduction means comprises structure for retrofitting the container assembly with the oxygen reduction means positioned at a chosen one of the air inlet and the air outlet; and
the oxygen reduction means capable of maintaining the oxygen level within the container interior at a level of 10,000 ppm or less.

14. The system of claim 13, wherein oxygen reduction means is capable of maintaining the oxygen level within the container interior a level of 10,000 ppm or less with the $CO_2$ level inside the container interior at 25-100% $CO_2$.

15. The system of claim 13, wherein said oxygen reduction means is capable of maintaining the oxygen level within the container interior at 1000 ppm or less.

16. The system of claim 13, wherein oxygen reduction means is capable of maintaining the oxygen level within the container interior to 1000 ppm or less with the $CO_2$ level inside the container interior 25-100% $CO_2$.

17. The system of claim 13, wherein said oxygen reduction means is selected from the group consisting of electrochemical means, chemical or biochemical means, mechanical means, catalytic means, pressure swing, and a combination thereof.

18. The system of claim 17, wherein said electrochemical oxygen reduction means is based on direct hydrogen powered fuel cell technology.

19. The system of claim 18, wherein one or more fuel cells is integrated into or adapted to said mechanically refrigerated system.

20. The system of claim 13, wherein said oxygen reduction means comprises one or more hydrogen fuel cells, each fuel cell comprising an anode and a cathode, wherein the recirculating, forced atmosphere stream can be directed across the one or more fuel cells with the anodes of said one or more fuel cells in communication with a hydrogen source, where oxygen is reacted with hydrogen ions to form water, heat and electricity.

21. The system of claim 20, wherein at least one fuel cell is located internal to the rigid sealable container.

22. The system of claim 13, wherein said rigid sealable container is selected from the group consisting of, a refrigerated shipping container, a refrigerated truck, a refrigerated rail car, a refrigerated break bulk ship hold, a refrigerated storage room, and a refrigerator.

23. A modified and controlled atmosphere (MA/CA) system, comprising;
- a rigid sealable container defining a container interior;
- a mechanical refrigeration unit;
- the mechanical refrigeration unit capable of generating a recirculating forced atmosphere stream from the container interior, through the mechanical refrigeration unit, and into the container interior;
- an oxygen reduction means adapted to the mechanical refrigeration system and positioned along the forced atmosphere stream;
- the oxygen reduction means capable of maintaining the oxygen level within the container interior at a level of 10,000 ppm or less;
- said oxygen reduction means comprising one or more hydrogen powered fuel cells, each fuel cell comprising an anode and a cathode, wherein the recirculating, forced atmosphere stream can be directed across the one or more hydrogen powered fuel cells with the anodes of said one or more fuel cells in communication with a hydrogen source, where oxygen is reacted with hydrogen ions to form water, heat and electricity; and
- means for selectively exposing the one or more hydrogen powered fuel cells to either the recirculating, forced atmosphere stream from an atmosphere inside the rigid sealable container during the oxygen reduction means operating step, or to an oxygen source other than the atmosphere inside the rigid sealable container during a power generating operating step.

24. The system of claim 23, wherein when said mechanically refrigerated system is in the power production mode, the system is effective to accomplish one or more the following:
charge one or more batteries;
maintain operation of the refrigeration unit to provide temperature control; and maintain operation of the oxygen reduction means to maintain the specified oxygen level.

25. A modified and controlled atmosphere (MA/CA) system, comprising;
- a rigid sealable container defining a container interior containing ambient container gas;
- a mechanical refrigeration unit;
- the mechanical refrigeration unit capable of generating a recirculating forced atmosphere stream from the container interior, through the mechanical refrigeration unit, and into the container interior;
- an oxygen reduction means adapted to the mechanical refrigeration system and positioned along the forced atmosphere stream;
- the oxygen reduction means capable of maintaining the oxygen level within the container interior at a level of 10,000 ppm or less;
- said oxygen reduction means comprising one or more hydrogen powered fuel cells, each fuel cell comprising an anode and a cathode, wherein the recirculating, forced atmosphere stream can be directed across the one or more fuel cells with the anodes of said one or hydrogen powered more fuel cells in communication with a hydrogen source, where oxygen is reacted with hydrogen ions to form water, heat and electricity; and
- an air bypass assembly comprising:
  - an air delivery portion by which an oxygen-containing, non-ambient gas, that is gas other than the ambient container gas, can be directed to the one or more hydrogen powered fuel cells; and
  - an air return portion by which the non-ambient gas can be directed from the one or more hydrogen powered fuel cells to a region external of the container interior.

* * * * *

UNITED STATES PATENT AND TRADEMARK OFFICE
CERTIFICATE OF CORRECTION

PATENT NO.         : 8,877,274 B2                                             Page 1 of 1
APPLICATION NO.    : 14/164004
DATED              : November 4, 2014
INVENTOR(S)        : Laurence Don. Bell It is certified that error appears in the above-identified patent and that said Letters Patent is hereby corrected as shown below:

In the Claims

In claim 12, column 22, line 7, after the word "claim", delete "9", and insert -- 11 --.
In claim 13, column 22, line 23, after the word "interior", insert -- ; --.

Signed and Sealed this
Twelfth Day of May, 2015

Michelle K. Lee
*Director of the United States Patent and Trademark Office*